United States Patent
Ohta et al.

(10) Patent No.: US 7,158,637 B2
(45) Date of Patent: Jan. 2, 2007

(54) SECURITY COMMUNICATION PACKET PROCESSING APPARATUS AND THE METHOD THEREOF

(75) Inventors: Yuusaku Ohta, Neyagawa (JP); Masashi Yamaguchi, Osaka (JP); Hiroki Yamauchi, Kusatsu (JP)

(73) Assignee: Matsushita Electric Industrila Co., Ltd., Osaka (JP)

( * ) Notice: Subject to any disclaimer, the term of this patent is extended or adjusted under 35 U.S.C. 154(b) by 802 days.

(21) Appl. No.: 10/017,392

(22) Filed: Dec. 18, 2001

(65) Prior Publication Data
US 2002/0083317 A1 Jun. 27, 2002

(30) Foreign Application Priority Data
Dec. 25, 2000 (JP) ............... 2000-391938

(51) Int. Cl.
*H04L 9/06* (2006.01)
*H04L 9/18* (2006.01)

(52) U.S. Cl. ............... 380/37; 713/160; 726/13
(58) Field of Classification Search ............ 380/37; 713/150, 168, 160; 726/13
See application file for complete search history.

(56) References Cited

U.S. PATENT DOCUMENTS

| 6,275,588 B1 * | 8/2001 | Videcrantz et al. ........ 380/255 |
| 2002/0078342 A1 * | 6/2002 | Matthews, Jr. .............. 713/151 |

FOREIGN PATENT DOCUMENTS

| WO | 00/30262 | 5/2000 |

OTHER PUBLICATIONS

Wassal A.G, et al., "*A VLSI Architecture for ATM Algorithm-Agile Encryption*"; Proceedings Great Lakes Symposium on VLSI, Mar. 4, 1999, pp. 325-328.
"ADSP-2141L Safenet DSP Security System of a Chip"by Analog Devices, pp. 1-5.

* cited by examiner

*Primary Examiner*—Emmanuel L. Moise
*Assistant Examiner*—Tamara Teslovich
(74) *Attorney, Agent, or Firm*—Wenderoth, Lind & Ponack, L.L.P.

(57) ABSTRACT

A security communication packet processing apparatus (100) comprises an encryption processing unit (102) that performs encryption processing and decryption processing in a data block unit of B1 bits, an authentication processing unit (104) that performs authentication processing in a data block unit of B2(=n×B1) bits in parallel to the encryption processing or the decryption processing in the encryption processing unit (102) and outputs an authentication value, a data block accumulation unit (103) that accumulates the data blocks from the encryption processing unit (102) and outputs the data blocks to the authentication processing unit (104) when the accumulated amount of the data blocks reaches B2 bits, a packet construction unit (105) that reconstructs a packet with the data blocks from the encryption processing unit (102) and the authentication value from the authentication processing unit (104), and an encryption and authentication processing control unit (101) that divides the inputted packet into the data blocks of B1 bits and outputs the data blocks sequentially to the encryption processing unit.

22 Claims, 18 Drawing Sheets

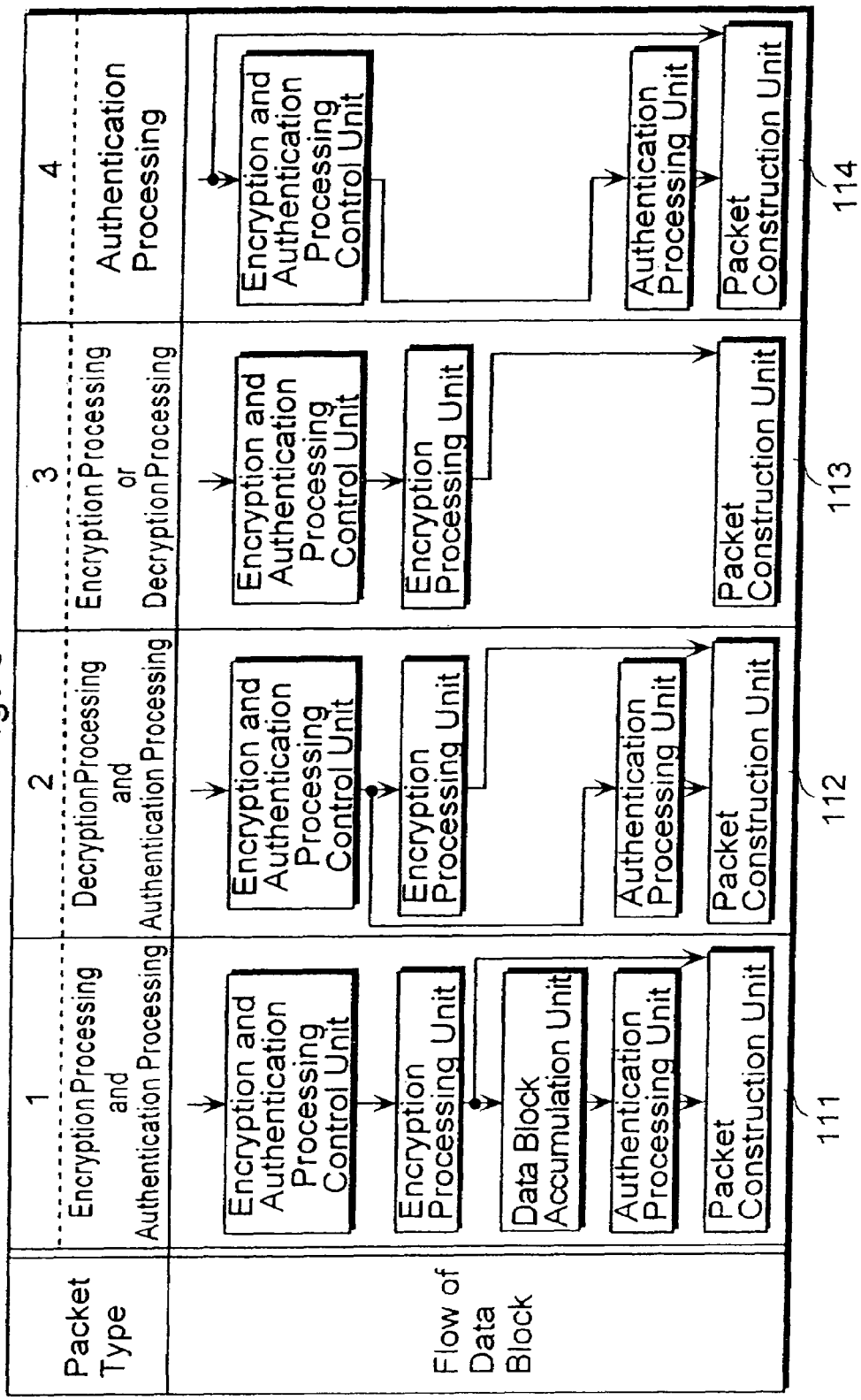

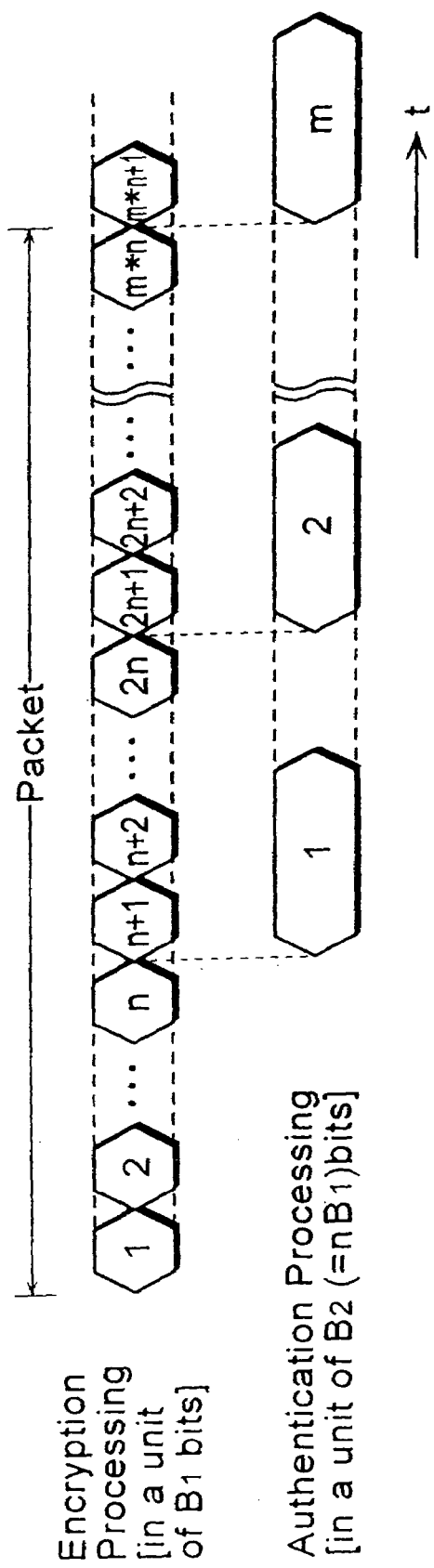

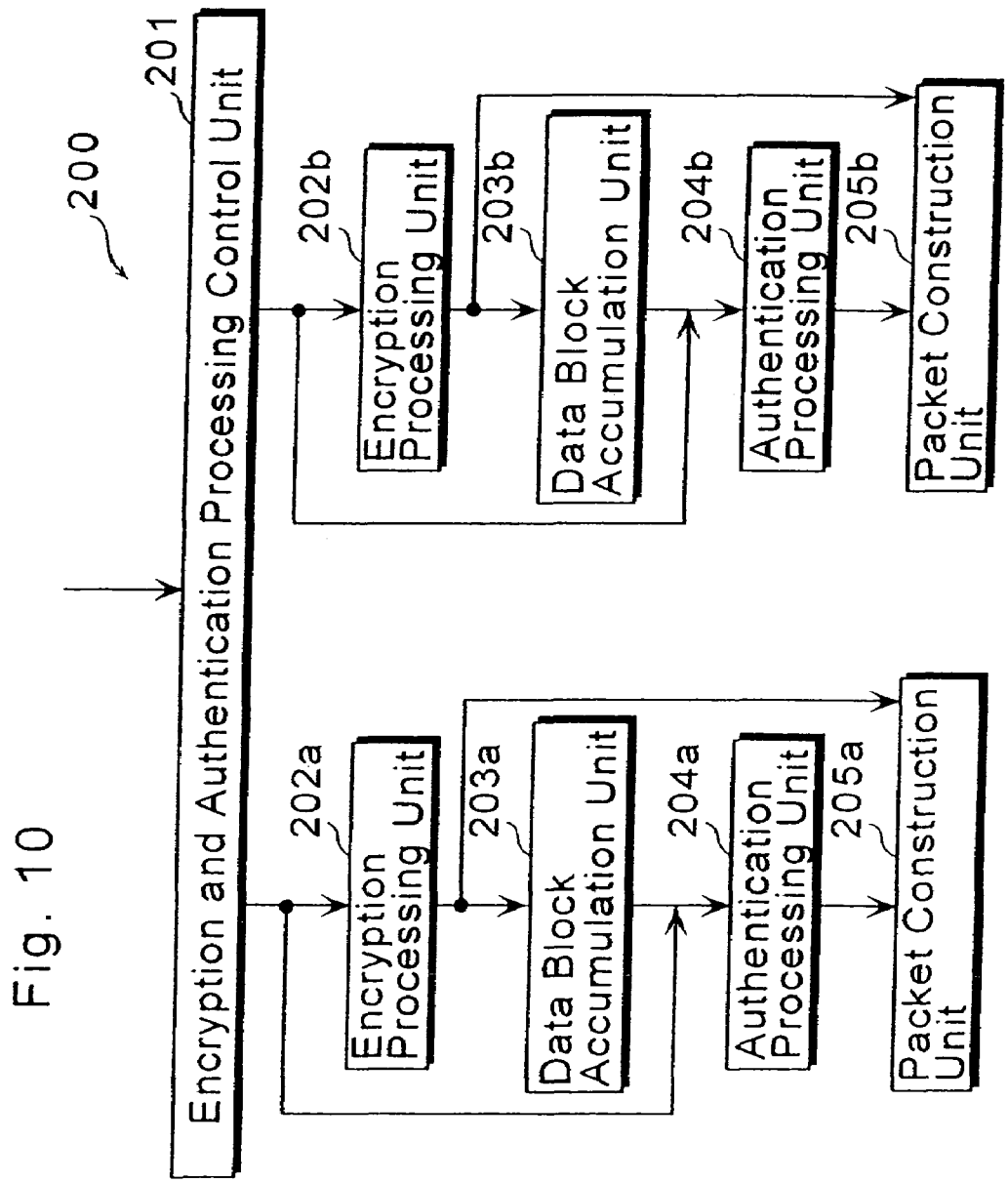

SECURITY COMMUNICATION PACKET PROCESSING APPARATUS AND THE METHOD THEREOF

BACKGROUND OF THE INVENTION (1) Field of the Invention

The present invention relates to a security communication packet processing apparatus for secret communication by a data packet and the method therefor. More specifically, the present invention relates to a technique for speeding up and reducing delay in security ensuring processing.

(2) Description of the Prior Art

As a TCP/IP network such as the Internet has rapidly become widespread in these years, various manners of net businesses such as an electronic music distribution and shopping on the Web have been spotlighted and developed one after another. Although it is the major premise of these kinds of net businesses that a secure and credible business is guaranteed between a service provider and a user, the Internet is generally considered to be an insecure network because it is always at risk of interception and pretence by a cracker. Thus, network security techniques such as electronic authentication, the encryption of communication data and a firewall have come into the picture. Although these techniques have been realized mainly by software, a demand for a high-speed processing by hardware such as a cipher processing chip and a cipher circuit board has been increased in preparation for a future broader band of communication channels in TCP/IP infrastructures.

In a computer or a network connection device having a security communication function such as IPSec (IP Security Protocol Suite), conventional processing for a packet that requires both encryption processing and authentication processing is performed, as shown in a flowchart of FIG. 1. For a packet (such as an IP packet) that requires encryption processing (Step 701), after a plaintext packet is first divided into data blocks for the encryption processing (Step 702) and the encryption processing of these data blocks is performed (Step 703), they are reconstructed as an encrypted packet (Step 704). Next, when the packet requires authentication processing (Step 705), after the encrypted packet is divided into data blocks for the authentication processing (Step 706) and the authentication processing of these data blocks is performed (Step 707), they are reconstructed as an authentication-processed packet (Step 708).

However, according to the above-mentioned method, packet construction processing needs to be performed twice (Step 704 and Step 708 in FIG. 1) for the packet that requires both encryption processing and the authentication processing. Therefore, there is a problem of speeding down (delay) of processing, a decrease of throughput and an ineffective use of an encryption processing unit or an authentication processing unit when both the encryption processing and the authentication processing are performed. Also, according to this method, there is a problem that a plaintext packet that should be processed by priority can not be processed by priority during the processing of another packet. Further, when only one encryption processing unit and authentication processing unit are respectively mounted, there is a problem that it is impossible to realize high-speed throughput by the simultaneous processing of plural packets.

SUMMARY OF THE INVENTION

Accordingly, in light of the above-mentioned problems, a first object of the present invention is to provide a security communication packet processing apparatus that makes it possible to speed up processing, reduce delay of the processing, increase throughput and use the encryption processing unit and the authentication processing unit effectively when both the encryption processing and the authentication processing are performed.

Also, a second object of the present invention is to provide a security communication packet processing apparatus that makes it possible to perform at least one of the encryption (or decryption) processing and the authentication processing for plural packets simultaneously and in parallel.

Further, a third object of the present invention is to provide a security communication packet processing apparatus with high processing efficiency that makes it possible to perform the processing by using only a required processing unit corresponding to a packet type among one or more encryption processing units and authentication processing units.

In addition, a fourth object of the present invention is to provide a security communication packet processing apparatus that makes it possible to control the priority processing of a packet for the encryption (including decryption) processing and the authentication processing.

The above-mentioned first object may be achieved by the security communication packet processing apparatus according to the present invention that is a network connection device or a computer having the security communication function. The security communication packet processing apparatus of the present invention comprises an encryption processing unit for processing a data block for encryption processing, an authentication processing unit for processing a data block for authentication processing, and an encryption and authentication processing control unit for outputting the data block for the encryption processing and the information which is necessary for the encryption processing to the encryption processing unit, outputting the data block for the authentication processing and the information which is necessary for the authentication processing to the authentication processing unit, and controlling the encryption processing unit and the authentication processing unit. The data blocks which were processed in the encryption processing unit are accumulated until the accumulated amount thereof reaches the smallest data block size for the authentication processing. The security communication packet processing apparatus also comprises a data block accumulation unit that outputs the accumulated amount to the authentication processing unit when the accumulated amount of data blocks reaches the smallest data block size for the authentication processing. The encryption processing unit performs the processing of the data block for the next encryption processing while the authentication processing unit is processing the data block outputted from the data block accumulation unit, and the data block accumulation unit accumulates the data block for the next authentication processing. As a result, by making the data block necessary and sufficient for the processing unit performing the encryption processing or the authentication processing for the packet requiring the encryption processing and the authentication processing, the processing delay is reduced and the throughput is improved, and the encryption processing unit and the authentication processing unit can effectively used.

The above-mentioned second object may be achieved by the security communication packet processing apparatus according to the present invention, wherein the number of at least one of the encryption processing unit and the authentication processing unit is two or more, and the number of the data block accumulation unit is equal to that of the encryption processing unit. As a result, plural packets can be processed in parallel, and the security processing with high throughput can be realized.

The above-mentioned third object may be achieved by the security communication packet processing apparatus according to the present invention comprising a data path connection switching unit that, according to a processing command of the encryption and authentication processing control unit, connects the output of the encryption and authentication processing control unit and the input of the encryption processing unit when the data block outputted from the encryption and authentication processing control unit is the data block for the encryption processing, connects the output of the encryption and authentication processing control unit and the input of the authentication processing unit when the data block outputted from the encryption and authentication processing control unit is the data block for the authentication processing, connects the output of the encryption processing unit and the input of the data block accumulation unit when the data block processed in the encryption processing unit further requires the authentication processing, and connects the output of the data block accumulation unit and the input of the authentication processing unit when the data accumulated in the data block accumulation unit is ready for being outputted. As a result, since the encryption processing unit, the data block accumulation unit and the authentication processing unit do not always need to correspond to each other one-to-one even when there are plural encryption processing units and/or the authentication processing units, the data block requiring the authentication processing after the encryption processing can be outputted to an arbitrary data block accumulation unit, and the output of the data block accumulation unit can be outputted to an arbitrary authentication processing unit. Therefore, the encryption processing unit, the data block accumulation unit and the authentication processing unit can be used more effectively, and the encryption processing unit and the authentication processing unit can be easily replaced and the number of them can be easily increased.

The above-mentioned fourth object may be achieved by the security communication packet processing apparatus according to the present invention, wherein, according to the instructions of the encryption and authentication processing control unit, a processing data saving unit for temporarily saving the data block processed in the encryption processing unit or the authentication processing unit and the data block accumulated in the data block accumulation unit along with the information on the data block is provided in a part of or all of the encryption processing unit, the authentication processing unit and the data block accumulation unit separately. As a result, the packet can be processed according to the priority.

Also, in the security communication packet processing apparatus according to the present invention, the processing data saving unit for temporarily saving the data block processed in the encryption processing unit or the authentication processing unit and the data block accumulated in the data block accumulation unit along with the information on the data block according to the instructions of the encryption and authentication processing unit may be provided in common to (shared by) an arbitrary combination of the encryption processing unit, the authentication processing unit and the data block accumulation unit. As a result, since an arbitrary encryption processing unit, authentication processing unit or data block accumulation unit connected to the processing data saving unit can use the one and common processing data saving unit, an arbitrary encryption processing unit, authentication processing unit or data block accumulation unit connected to the processing data saving unit can restart the processing of the data block in the middle of the processing in the processing data saving unit. Accordingly, the above-mentioned fourth object can be achieved in a structure which is different from that of the above-mentioned security communication packet processing apparatus.

Here, in the above-mentioned security communication packet processing apparatus, the data block for the encryption processing can be 64 bits, and the data block for the authentication processing can be 512 bits. In this case, the data block accumulation unit may output the data blocks when it accumulates eight encrypted data blocks.

Note that the present invention can be realized as security communication packet processing methods in which the characteristic control units of the above-mentioned security communication packet processing apparatus are processing steps, or as a program for making a computer perform these processing steps. Further, the program can, of course, be distributed via a recording medium such as CD-ROM or a transmitting medium such as a communication network.

BRIEF DESCRIPTION OF THE DRAWINGS

These and other objects, advantages and features of the present invention will become more apparent from the following detailed description when taken in conjunction with the accompanying drawings which illustrate a specific embodiment of the invention. In the Drawings:

FIG. 3 is diagram describing the control of a data path in an encryption and authentication processing control unit.

FIG. 7 is a diagram showing an operation timing of the encryption processing in the encryption processing unit and the authentication processing in the authentication processing unit.

FIG. 10 is a block diagram showing a structure of the security communication packet processing apparatus according to the second embodiment of the present invention.

DESCRIPTION OF THE PREFERRED EMBODIMENTS

The following is an explanation of the embodiments of the present invention with reference to the drawings.

First Embodiment

First, the security communication packet processing apparatus according to the first embodiment of the present invention will be explained.

Figure 1:
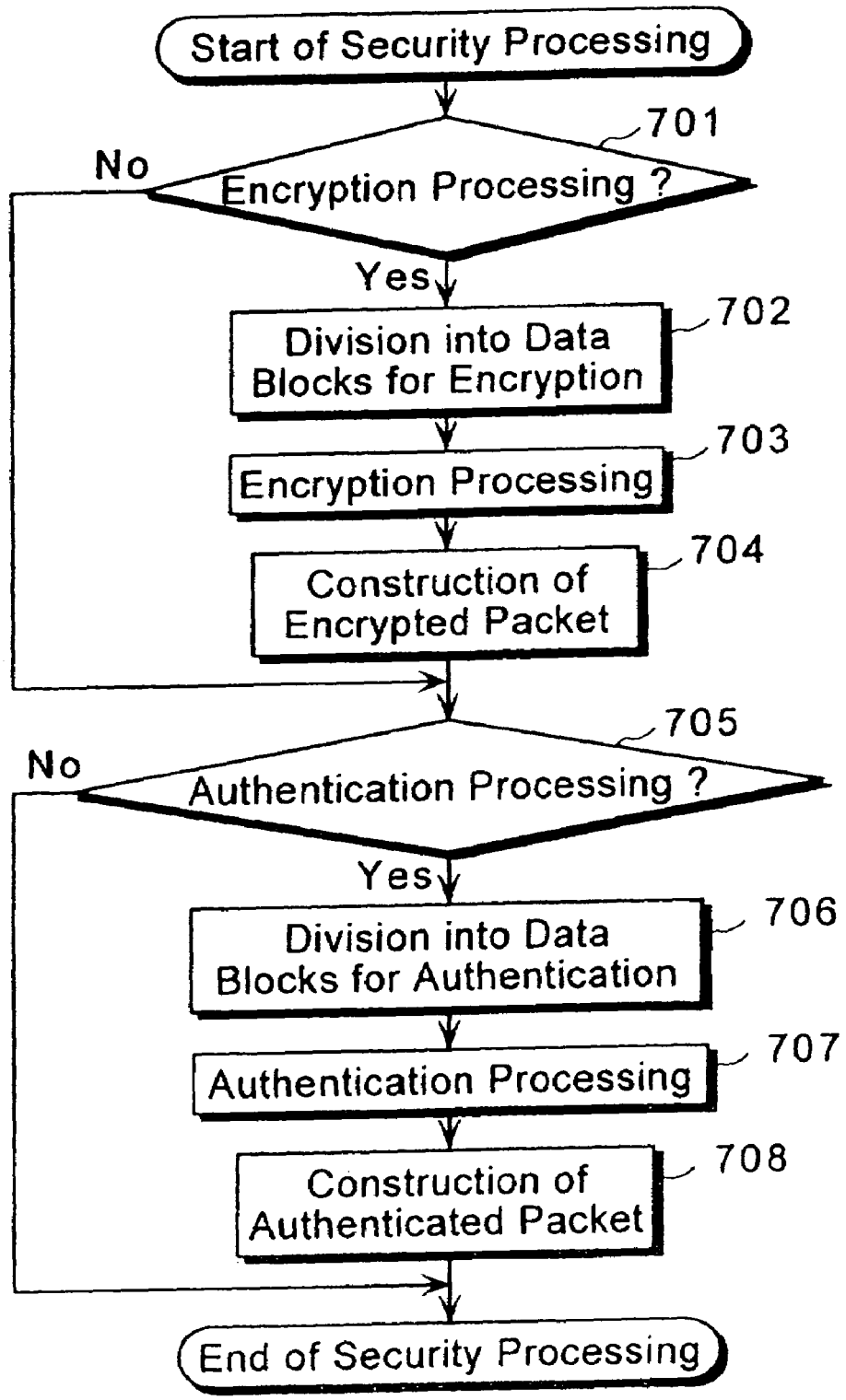
FIG. 1 is a flowchart showing a conventional processing procedure for a packet that requires both encryption processing and authentication processing.
Figure 2:
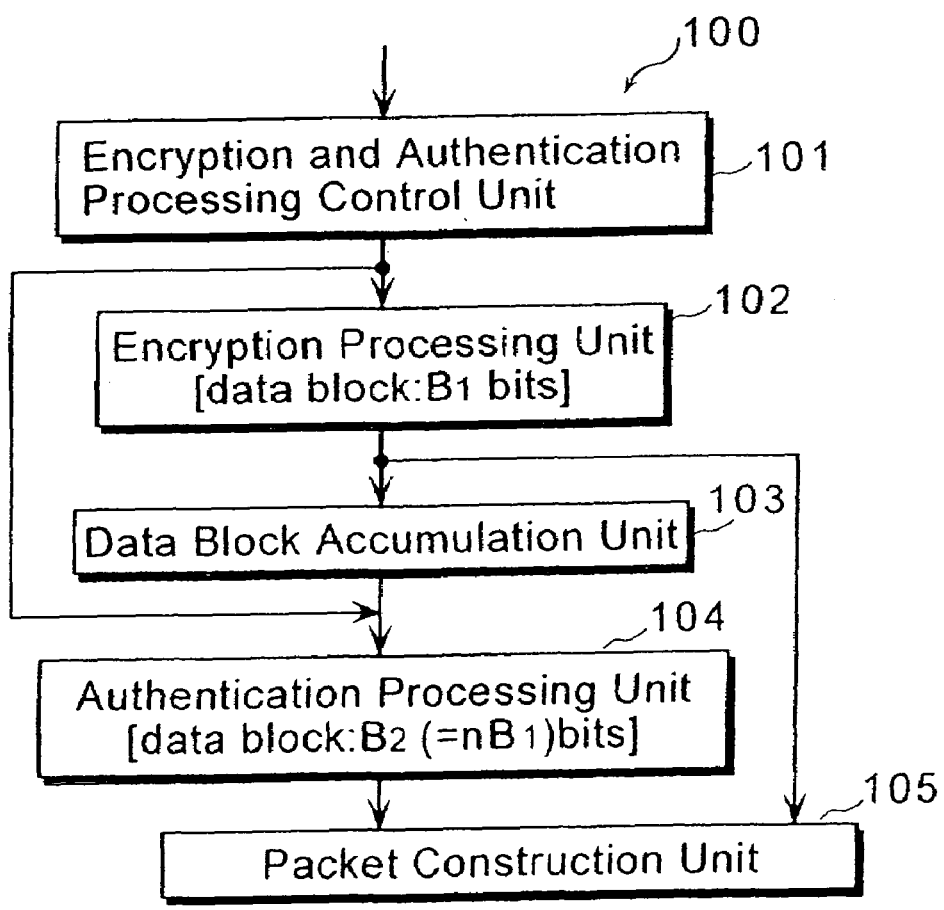
FIG. 2 is a block diagram showing a structure of a security communication packet processing apparatus according to the first embodiment of the present invention.

FIG. 2 is a block diagram showing a structure of a security communication packet processing apparatus 100 according to the first embodiment of the present invention. The security communication packet processing apparatus 100 according to the first embodiment performs in a block unit the encryption (including decryption) processing and the authentication processing required for a packet such as an inputted IP packet, reconstructs the processed packet as a packet and outputs the reconstructed packet. The security communication packet processing apparatus 100 is characterized by having an essential and fundamental structure that can complete both the encryption (including decryption) processing and the authentication processing by only one packet reconstruction processing, and comprises four circuit blocks which are connected in a fixed manner, that is, an encryption and authentication processing control unit 101, an encryption processing unit 102, a data block accumulation unit 103, an authentication processing unit 104, and a packet construction unit 105.

Note that, according to the first embodiment, packets that are inputted to the encryption and authentication processing control unit 101 are classified into four types according to the type of processing which should be performed to the packets. The first type is a packet (a transmitting packet) which requires both the encryption processing and the authentication processing, the second type is a packet (a receiving packet) which requires both the decryption processing and the authentication processing, the third type is a packet which requires either the encryption processing or the decryption processing only, and the fourth type is a packet which requires the authentication processing only.

The encryption and authentication processing control unit 101 receives a packet which should be processed as well as information that is required for the processing of the packet (hereinafter referred to as "processing information") from the outside. Based on the received processing information, the encryption and authentication processing control unit 101 performs control of the other components 102–105 (that is, control of them to operate ON/Off, etc.), and control of determining the data path. Further, the encryption and authentication processing control unit 101 divides a packet into data blocks for the encryption processing (or decryption processing) of B1 (64, for example) bit length (bits) as a processing unit of the encryption processing unit 102, so as to output the B1 bits including the processing information thereof to the encryption processing unit 102, and divides a packet into data blocks for the authentication processing of B2 (512, for example) bit length (bits) as a processing unit of the authentication processing unit 104 so as to output the B2 bits including the processing information thereof to the authentication processing unit 104.

"Processing information" here includes whether or not the encryption processing is to be performed, whether or not the authentication processing is to be performed, and which processing is to be performed, the encryption processing or the decryption processing. When the encryption processing is to be performed, the processing information includes an algorithm, key information and an IV (Initial Vector), and when the authentication processing is to be performed, the processing information includes an algorithm, necessary key information and an authentication value. Note that the cipher algorithm includes DES (Data Encryption Standard) and 3DES. Also, the authentication algorithm includes HMAC-MD5-96 and HMAC-SHA-1-96. Further, since a packet and its processing information are corresponded to each other by an identification number, etc., a mechanism is guaranteed not to confuse plural packets when they are inputted in sequence to the encryption and authentication processing control unit 101.

FIG. 3 is diagram describing the control of a data path in the encryption and authentication processing control unit 101. When the encryption and authentication processing control unit 101 determines, based on the processing information, that a corresponded packet is a transmitting packet of the first type as mentioned above, that is, a packet that requires both encryption processing and authentication processing, the encryption and authentication processing control unit 101 controls the components 102–105 respectively so that a data flow is formed as shown in the data path diagram 111 of FIG. 3. In other words, the encryption processing performed by the encryption processing unit 102 and the authentication processing performed by the authentication processing unit 104 are sequentially performed to the packet in a unit of a data block. Accordingly, the result of the authentication processing (the authentication value) is inputted to the packet construction unit 105, and the result of the encryption processing by the encryption processing unit 102 (the encrypted data block) is inputted to the packet construction unit 105.

Also, when the encryption and authentication processing control unit 101 determines that a packet is a receiving packet of the second type as mentioned above, that is, a packet that requires both decryption processing and authentication processing, the encryption and authentication processing control unit 101 controls the components 102–105 respectively so that a data flow is formed as shown in the data path diagram 112 of FIG. 3. In other words, the decryption processing performed by the encryption processing unit 102 and the authentication processing performed by the authentication processing unit 104 are performed in parallel to the packet in a unit of a data block, and these results (that is, the decrypted data block and the authentication value) are inputted to the packet construction unit 105.

Also, when the encryption and authentication processing control unit 101 determines that a packet is the third type, that is, a packet that requires either encryption processing or decryption processing, the encryption and authentication processing control unit 101 controls the components 102–105 respectively so that a data flow is formed as shown in the data path diagram 113 of FIG. 3. In other words, the encryption processing performed or the decryption processing by the encryption processing unit 102 and the authentication processing performed by the authentication processing unit 104 are performed in parallel to the packet in a unit of a data block, and the these results (that is, the encrypted or the decrypted data block and the authentication value) are inputted to the packet construction unit 105.

Further, when the encryption and authentication processing control unit 101 determines that a packet is the fourth type, that is, a packet that requires the authentication processing only, the encryption and authentication processing control unit 101 controls the components 102–105 so that a data flow is formed as shown in the data path diagram 114 of FIG. 3. In other words, the packet is forwarded to the packet construction unit 105, the authentication processing by the authentication processing unit 104 is performed to the packet in a unit of a data block, and the result (that is, the authentication value) is inputted to the packet construction unit 105.

The encryption processing unit 102, which is a circuit or the like that performs the block encryption and decryption according to the cipher algorithm such as a DES and 3DES, performs the encryption processing to a data block for encryption (or decryption) processing of B1 bits transmitted from the encryption and authentication processing control unit 101 in a predetermined number of steps (a clock cycle), and outputs the result to the data block accumulation unit 103 or the packet construction unit 105 as the encrypted (or decrypted) data block.

Figure 4A:
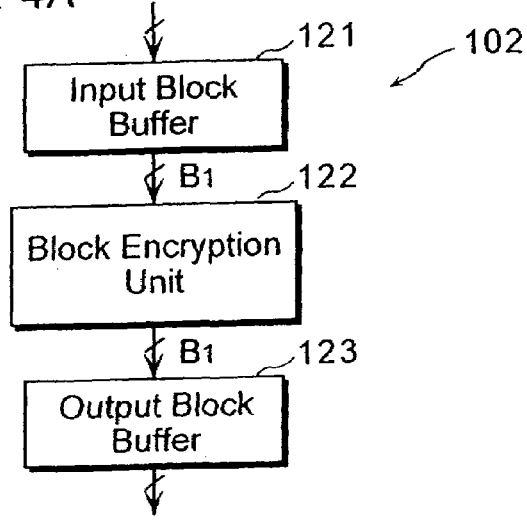
FIG. 4A is a block diagram showing an example of a detailed structure of an encryption processing unit.

FIG. 4A is a block diagram showing an example of a detailed structure of the encryption processing unit 102. The encryption processing unit 102 comprises an input block buffer 121 which stores an inputted data block for the encryption (or decryption) processing of B1 bits, a block encryption unit 122 which performs the block encryption (and decryption) and the processing of the key for the block encryption (and decryption), and an output block buffer 123 which stores the result of the encryption (or decryption) processing (that is, the encrypted (or the decrypted) data block of B1 bits).

Figure 4B:
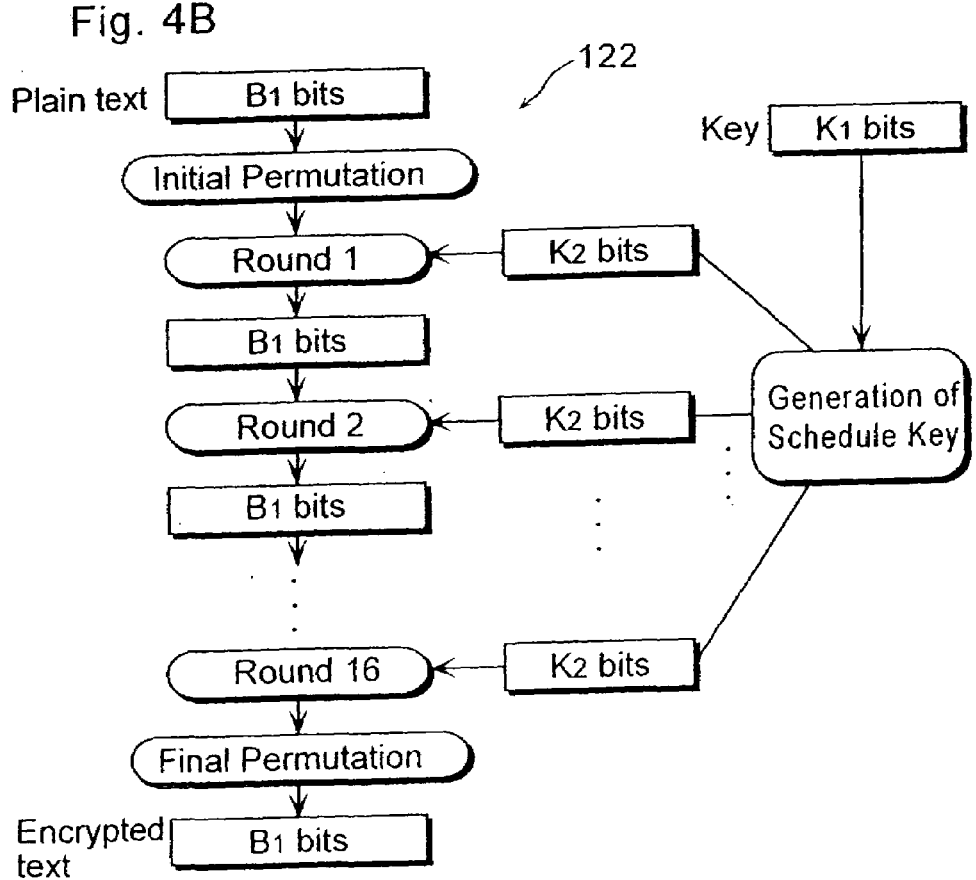
FIG. 4B is a diagram showing an example of the encryption (or the decryption) processing in a block encryption unit as shown in FIG. 4A.

FIG. 4B is a diagram showing an example of the encryption (or the decryption) processing in the block encryption unit 122 as shown in FIG. 4A. To a data block of B1 bits outputted from the input block buffer 121, fixed bit replacement (initial replacement), then scramble processing of 16 rounds determined by a key, and finally fixed bit replacement (final replacement) are performed. A secret key of K1 bits included in the processing information transmitted from the encryption and authentication processing control unit 101 is divided into 16 partial keys of K2 bits after certain processing for creating a schedule key is performed, and is used to take an exclusive OR with a data block in each corresponding scramble processing and to determine processing details of bit replacement.

The data block accumulation unit 103 is a queue buffer or the like that accumulates encrypted data blocks outputted from the encryption processing unit 102, and outputs the data of B2 bits to the authentication processing unit 104 as a data block for the authentication processing when the accumulated amount of encrypted data blocks reaches that of the data block (B2 bits) to which the authentication processing can be performed by the authentication processing unit 104.

Figure 5A:
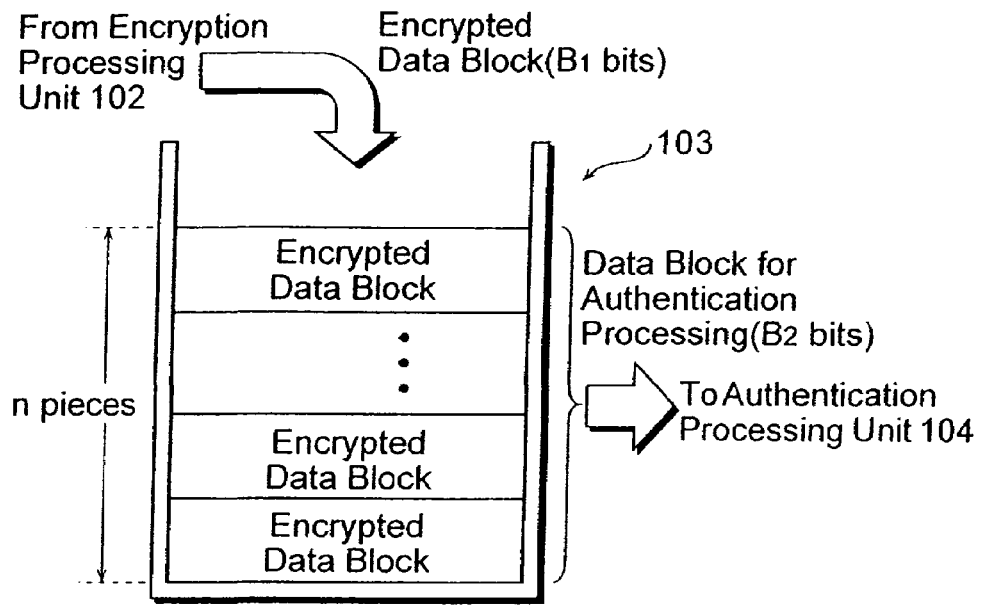
FIG. 5A is a data flow diagram showing a function of a data block accumulation unit.
Figure 5B:
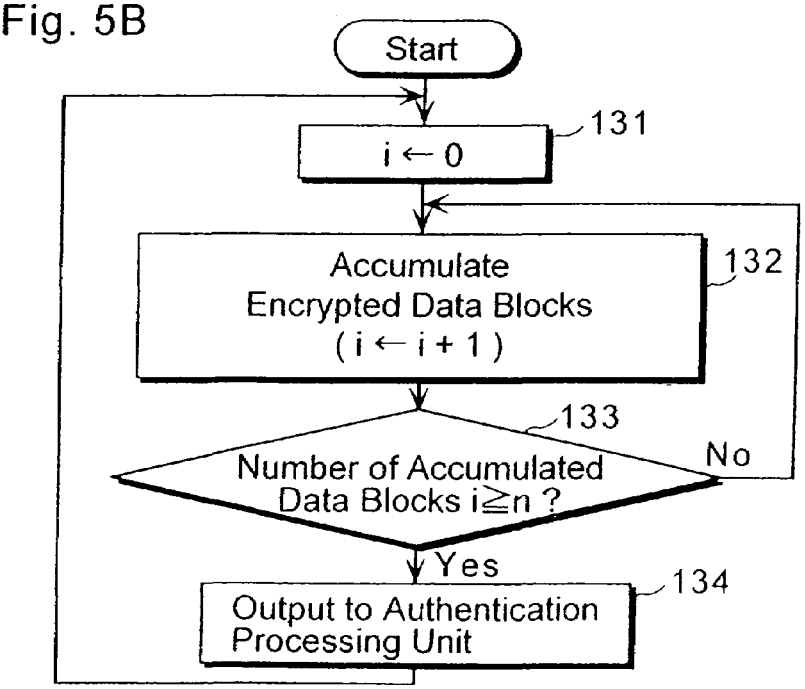
FIG. 5B is a flowchart showing a processing procedure in the data block accumulation unit.

FIG. 5A is a data flow diagram showing a function of the data block accumulation unit 103. Here, the bit length B2 of the data block for the authentication processing which is inputted to the authentication processing unit 104 is n times of the bit length B1(=n×B1) of the encrypted data block which is outputted from the encryption processing unit 102. FIG. 5B is a flowchart showing a processing procedure that is performed in the data block accumulation unit 103. The data block accumulation unit 103, which is realized in a register file of B1 bit width with a counter, for example, repeats the processing (Steps 131–134) of resetting the counter (Step 131), accumulating encrypted data blocks outputted from the encryption processing unit 102 (Steps 132 and 133), and when the number of the data blocks reaches n (Step 133), outputting n encrypted data blocks to the authentication processing unit 104 as parallel data of B2 bits, for example (Step 134).

The authentication unit 104, which is a circuit or the like that performs the authentication processing (that is, the processing including the calculation of an ICV (Integrity Check Value) and verification of its integrity), according to the authentication algorithm such as HMAC-MD5-96 and HMAC-SHA-1-96, etc., performs the authentication processing to the data blocks of B2 bits for the authentication processing transmitted from the encryption and authentication processing control unit 101 or the data block accumulation unit 103 in a predetermined number of steps (a clock cycle), and outputs the result as the authentication value to the packet construction unit 105.

Figure 6A:
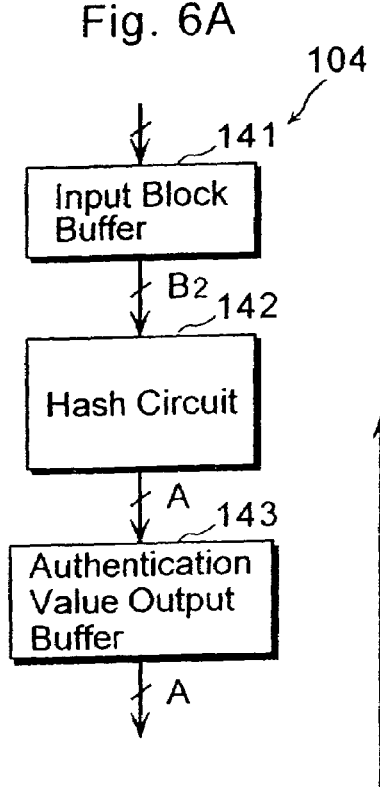
FIG. 6A is a block diagram showing an example of a detailed structure of an authentication processing unit.

FIG. 6A is a block diagram showing an example of a detailed structure of the authentication processing unit 104. The authentication processing unit 104 comprises an input block buffer 141 that stores an inputted data block of B2 bits for the authentication processing, a hash circuit 142 that calculates a hash value of A (96, for example) bits for m pieces of data blocks for the authentication processing which constitutes one packet by performing certain hash processing to the data block for the authentication processing transmitted from the input block buffer 141, and an authentication value output buffer 143 that stores the calculated hash value as the authentication value.

Figure 6B:
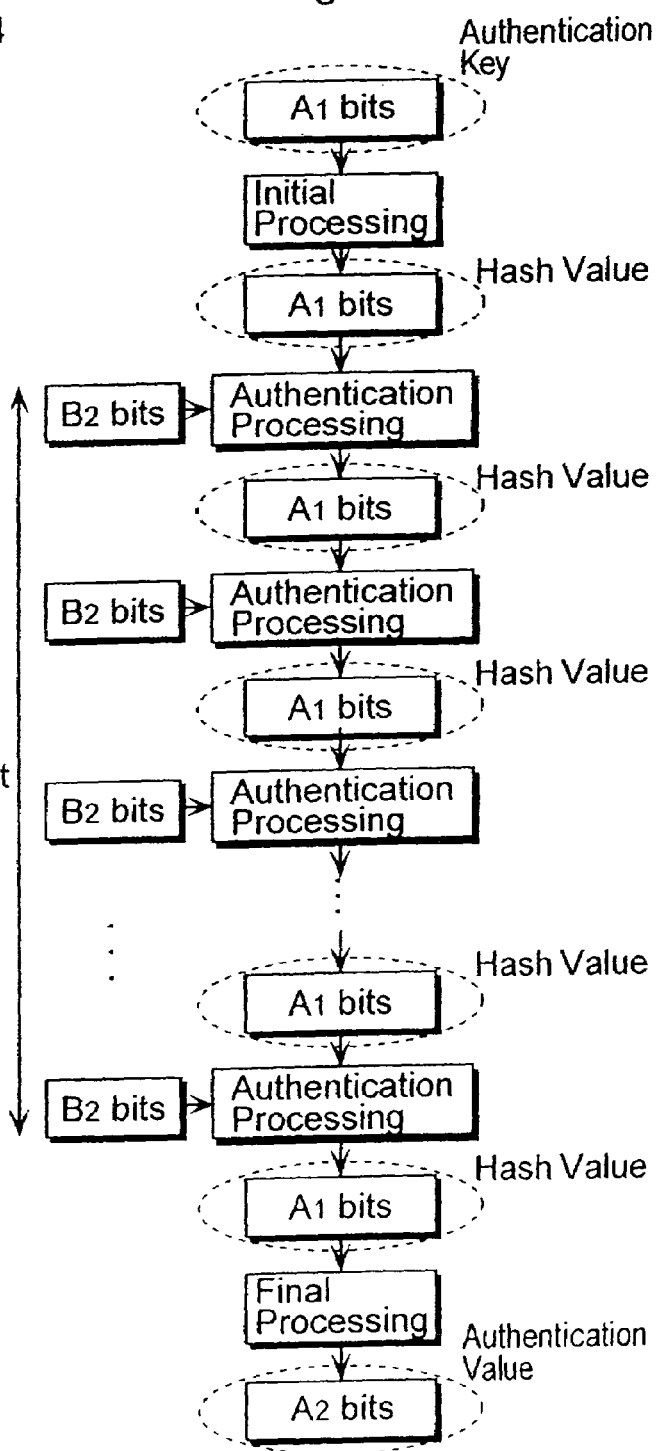
FIG. 6B is a diagram showing an outline of hash processing in a hash circuit as shown in FIG. 6A.

FIG. 6B is a diagram showing an outline of the hash processing performed in the hash circuit 142 as shown in FIG. 6A. The data block of B2 bits inputted to the input block buffer 141 is processed in a certain manner based on the authentication value of A1 bits which is stored by the hash circuit 142 at that time so as to update the authentication value of A1 bits. The data block of B2 bits inputted next is processed in a certain manner based on the hash value of A1 bits which was just previously updated so as to further update the authentication value of A1 bits which is stored by the hash circuit 142. This processing is repeated, and a part of the hash value of A1 bits which was updated for the last data block of B2 bits is used as the authentication value of A2 bits for this packet.

The packet construction unit 105 lines up the encrypted (or decrypted) data blocks outputted from the encryption processing unit 102 in a certain order according to the processing information or the like which is informed from the encryption and authentication processing control unit 101 so as to accumulate the encrypted (or decrypted) data blocks, and constructs a processed packet corresponding to one packet that is inputted to the encryption and authentication processing unit 101 by incorporating the authentication value outputted from the authentication processing unit 104 into a predetermined location. More specifically, for a transmitting packet of the first type as mentioned above, an encrypted and authentication-processed packet in a predetermined format is reconstructed by accumulating the encrypted data blocks outputted from the encryption processing unit 102 as well as incorporating the authentication value outputted from the authentication processing unit 104. For a receiving packet of the second type as mentioned above, a decrypted and authentication-processed data block is reconstructed according to a predetermined format by accumulating the decrypted data blocks outputted from the encryption processing unit 102 as well as incorporating the authentication valve outputted from the authentication processing unit 104. Likewise, for the third type packet, an encrypted (or decrypted) packet in a predetermined format is reconstructed by accumulating the encrypted (or decrypted) data blocks outputted from the encryption processing unit 102, and for the fourth type packet, a packet inputted to the security communication packet processing apparatus 100 is constructed as an authentication-processed packet according to a predetermined format.

Note that reconstruction of an encrypted data block includes reconstruction for a cipher payload prescribed by IPSec (ESP: Encapsulating Security Payload) in a format corresponding to a tunnel mode and a transport mode. Similarly, reconstruction of an authentication value includes reconstruction for an authentication header prescribed by IPSec (AH: Authentication Header) in a format corresponding to a tunnel mode and a transport mode. Packet types such as Ipv4 and Ipv6 are included, for example.

Next, the operation of the security communication packet processing apparatus 100 according to the first embodiment as structured above will be explained respectively in the cases where the above-mentioned four types of packets are inputted.

First, the processing process in the case where the first type packet, that is, a packet that requires both encryption processing and authentication processing, is inputted to the security communication packet processing apparatus 100 (the processing process corresponding to the data path diagram 111 in FIG. 3) will be explained.

As the first step, the encryption and authentication processing control unit 101 receives a packet which should be processed and the processing information thereof. The encryption and authentication processing control unit 101 judges from the processing information that the packet is a transmitting packet that requires both encryption processing and authentication processing, divides the packet into data blocks for the encryption processing, and sequentially transmits the data blocks along with the processing information thereof to the encryption processing unit 102.

As the second step, the encryption processing unit 102 receives the processing information and the data blocks for the encryption processing from the encryption and authentication processing control unit 101, determines from the processing information a cipher algorithm, a key, an IV and an encryption processing method which should be applied to the data block, and encrypts the data blocks for the encryption processing according to the processing method. Note that this may be realized so that plural cipher algorithms can be processed in the encryption processing unit 102. The encrypted data blocks are outputted to the packet construction unit 105 and, at the same time, outputted to the data block accumulation unit 103 along with the processing information necessary for the authentication processing for the following authentication processing. Note that the encryption processing unit 102 performs the processing repeatedly each time the next data block for the encryption processing is inputted.

As the third step, the data block accumulation unit 103 successively accumulates the data blocks for the encryption processing outputted from the encryption processing unit 102 until the amount of the accumulated encrypted data blocks reaches the data block size that is necessary for the authentication processing. When the accumulated encrypted data blocks reach the data block size that is necessary for the authentication processing, the data block accumulation unit 103 outputs them along with the processing information thereof to the authentication processing unit 104. The data block accumulation unit 103 judges the accumulation status of whether the accumulated amount of the encrypted data blocks is equal to the data block size for the authentication by counting the amount by using an accumulated block counter or the like that the data block accumulation unit 103 has. Note that this may be realized in the method where the encryption and authentication processing control unit 101 has the accumulated block counter.

The data block accumulation unit 103 accumulates the next encrypted data block each time the next encrypted data block is inputted, repeats the judgment of whether the number of the accumulated encrypted data blocks reaches n pieces, and when the number of accumulated encrypted data blocks reaches n, outputs the accumulated encrypted data blocks to the authentication processing unit 104.

As the fourth step, the authentication processing unit 104 receives the encrypted data blocks for the authentication processing and the processing information thereof from the data block accumulation unit 103, performs the authentication processing according to the processing information, and calculates the authentication value. The output value of the authentication processing unit 104 is the authentication value of the packet which is now being processed.

The first through fourth steps as mentioned above are repeatedly applied to all the data blocks that require both encryption processing and authentication processing among transmitting packets that require both encryption processing and authentication processing.

Finally, as the fifth step, the packet construction unit 105 constructs an encrypted and authentication-processed packet corresponding to one packet that is inputted to the encryption and authentication processing control unit 101 by lining up the encrypted data blocks outputted from the encryption processing unit 102 in a predetermined order so as to accumulate them and incorporating the authentication value outputted from the authentication processing unit 104 into a predetermined location.

FIG. 7 is a diagram showing an operation timing of the encryption processing in the encryption processing unit 102 and the authentication processing in the authentication processing unit 104. Here, one packet is divided into m×n pieces of data blocks for the encryption processing, and n pieces of data blocks for the encryption processing (the encrypted data blocks) correspond to one data block for the authentication processing. Therefore, one packet is divided into m pieces of data blocks for the authentication processing.

As shown in FIG. 7, encrypted data blocks to which the encryption processing is performed in the encryption processing unit 102 are accumulated in the data block accumulation unit 103 one by one. When n pieces of encrypted data blocks are accumulated in the data block accumulation unit 103, n pieces of these encrypted data blocks are taken from the data block accumulation unit 103 and transferred to the authentication processing unit 104, where the authentication processing is performed to them as the first data block for authentication processing. In this way, the encryption processing and the authentication processing are repeated in parallel. As a result, the encryption processing is performed to this one transmitting packet m×n times, and the authentication processing is performed m times. Note that since the length, encryption and authentication algorithms and others of the transmitting packet which is to be inputted to the security communication packet processing apparatus 100 are not fixed, the number of times of the encryption processing and the authentication processing can be dynamically determined based on the processing information accompanying to the packet.

Next, the processing process in the case where the second type packet, that is, a receiving packet that requires both decryption processing and authentication processing, is inputted to the security communication packet processing apparatus 100 (the processing process corresponding to the data path diagram 112 in FIG. 3) will be explained.

As the first step, the encryption and authentication processing control unit 101 receives a packet which should be processed and the processing information thereof. The encryption and authentication processing control unit 101 judges from the processing information that the packet is a receiving packet that requires both decryption processing and authentication processing, and duplicates the packet. Then, the encryption and authentication processing control unit 101 divides one packet into data blocks for the decryption processing as a packet for the decryption processing and outputs the data blocks along with the processing information thereof to the encryption processing unit 102. Further, the encryption and authentication processing control unit 101 divides another packet into data blocks for the authentication processing as a packet for the authentication processing and outputs the data blocks along with the processing information thereof to the authentication processing unit 104.

As the second step, the following two types of processing are performed in parallel. As the first processing, the encryption processing unit 102 decrypts the received data blocks based on the processing information thereof, and outputs the decrypted data blocks to the packet construction unit 105. As the second processing, the authentication processing unit 104 performs the authentication processing to the received data blocks for authentication processing, and calculates the authentication value.

The above-mentioned first and second steps are repeatedly applied to all the data blocks that require both decryption processing and authentication processing among the receiving packets that require both the decryption processing and the authentication processing.

Finally, as the third step, the packet construction unit 105 lines up the decrypted data blocks outputted from the encryption processing unit 102 in a predetermined order to accumulate them according to the processing information which is informed by the encryption and authentication processing control unit 101, and the packet construction unit 105 it incorporates the authentication value outputted from the authentication processing unit 104 into a predetermined location so as to construct a decrypted and authentication-processed packet corresponding to one packet that is inputted to the encryption and authentication processing control unit 101.

Next, the processing process in the case where the third type packet, that is, a packet that requires the encryption processing or the decryption processing, is inputted to the security communication packet processing apparatus 100 (the processing process corresponding to the data path diagram 113 in FIG. 3) will be explained in detail.

As the first step, the encryption and authentication processing control unit 101 receives a packet which should be processed and the processing information thereof. The encryption and authentication processing control unit 101 judges from the processing information that the packet is a packet that requires the decryption processing or the decryption processing, divides the packet into data blocks for the encryption processing, and outputs the data blocks along with the processing information thereof to the encryption processing unit 102.

As the second step, the encryption processing unit 102 receives the data blocks for encryption processing and the processing information thereof, performs the encryption processing or the decryption processing according to the processing information, and outputs the encrypted or decrypted-processed data blocks to the packet construction unit 105.

The above-mentioned first and second steps are repeatedly applied to all the data blocks that require the encryption processing or the decryption processing among the packets that require either the encryption processing or the decryption processing.

Finally, as the third step, the packet construction unit 105 lines up the encryption (or decryption)-processed data blocks outputted from the encryption processing unit 102 in a predetermined order to accumulate them according to the processing information which is informed by the encryption and authentication processing control unit 101, and the packet construction unit 105 constructs an encryption (or decryption)-processed packet corresponding to one packet that is inputted to the encryption and authentication processing control unit 101.

Next, the processing process in the case where the fourth type packet, that is, a packet that requires the authentication processing only, is inputted to the security communication packet processing apparatus 100 (the processing process corresponding to the data path diagram 114 in FIG. 3) will be explained.

As the first step, the encryption and authentication processing control unit 101 receives a packet which should be processed and the processing information thereof. The encryption and authentication processing control unit 101 judges from the processing information that the packet is a packet that requires the authentication processing only, divides the packet into data blocks for the authentication processing, and outputs the data blocks along with the processing information thereof to the authentication processing unit 104.

As the second step, the authentication processing unit 104 receives the data blocks for the authentication processing and the processing information thereof, performs the authentication processing according to the processing information, and calculates the authentication value.

The above-mentioned first and second steps are repeatedly applied to all the data blocks that require the authentication processing among the packets that require the authentication processing only.

Finally, as the third step, the packet construction unit 105 incorporates the authentication value outputted from the authentication processing unit 104 into the packet inputted to the security communication packet processing apparatus 100 according to the processing information that is informed by the encryption and authentication processing control unit 101 so as to construct an authentication-processed packet corresponding to one packet that is inputted to the encryption and authentication processing control unit 101.

As mentioned above, according to the security communication packet processing apparatus 100 of the first embodiment, a packet which was inputted to the security communication packet processing apparatus 100 is judged to determine which type among the four types the inputted packet is, divided into data blocks of a required size, and encrypted (or decrypted) and authenticated so as to be restored to a processed packet by only one packet reconstruction.

In other words, conventionally, encryption processing is first performed to a transmitting packet that requires both encryption processing and authentication processing to construct the packet as an encrypted packet, and then the processed packet is again divided into data blocks for the authentication processing to be authenticated, so the packet needs to be constructed twice after the encryption processing and the authentication processing, and the authentication processing unit 104 must wait until the encrypted data blocks are reconstructed as a packet. On the other hand, according to the first embodiment, the data block accumulation unit 103 is provided between the encryption processing unit 102 and the authentication processing unit 104 so that data blocks of a size which is necessary and sufficient for the processing are always inputted to the encryption processing unit 102 and the authentication processing unit 104, and the divided packet is reconstructed only once for any security processing. That is, since the data block accumulation unit 103 accumulates encrypted data blocks until they reach a size of data blocks that is required for the authentication processing, and outputs the accumulated data blocks to the authentication processing unit 104, an input waiting time for the authentication processing unit 104 is more drastically reduced than the conventional method. Accordingly, improvement of throughput, reduction of delay and speeding up of the security processing of the packet as well as an effective use of the encryption processing unit and the authentication processing unit become possible.

Figure 8:
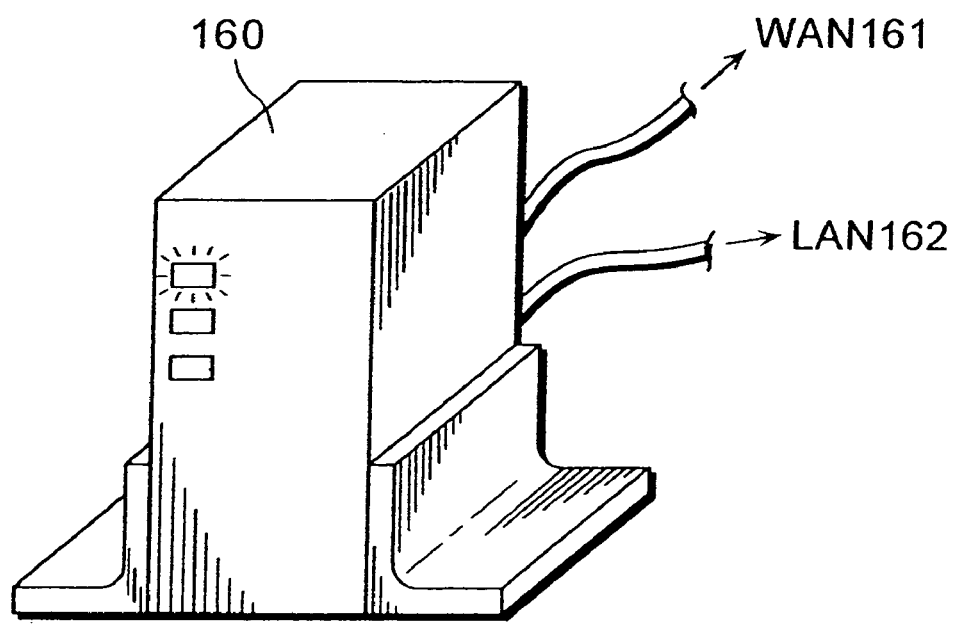
FIG. 8 is a diagram showing an example of an application to a product of the security communication packet processing apparatus according to the first embodiment of the present invention.

FIG. 8 is a diagram showing an example of an application to a product of the security communication packet processing apparatus 100 according to the first embodiment of the present invention. Here, an appearance of a security gateway 160 which functions as a router and a fire wall is illustrated. The security gateway 160 is a communication apparatus that securely interconnects a WAN 161, which is a public communication network such as the Internet, and a LAN 162, which is a private communication network connecting plural computers and others for in-house use. More specifically, this security gateway 160 is, for example, a gateway at an IP level corresponding to the IPSec specifications disclosed in Request For Comments 2401–2410 published by IETF (Internet Engineering Task Force). To an IP packet that is outputted from the LAN 162 to the WAN 161, the encryption processing and the authentication processing, the encryption processing only, or the authentication processing only are performed according to need, while to an IP packet that is outputted from the WAN 161 to the LAN 62, the decryption processing and the authentication processing, the decryption processing only, or the authentication processing only are performed, so as to connect plural communication apparatus via the WAN 161 through a secure communication path which can eliminate a fradulent practice such as interception or pretence by a third party.

Figure 9B:
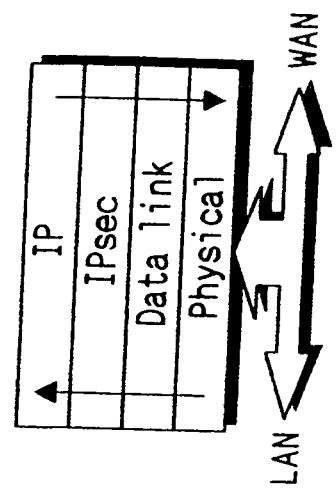
FIG. 9B shows a protocol stack indicating the communication functions of the security gateway.
Figure 9A:
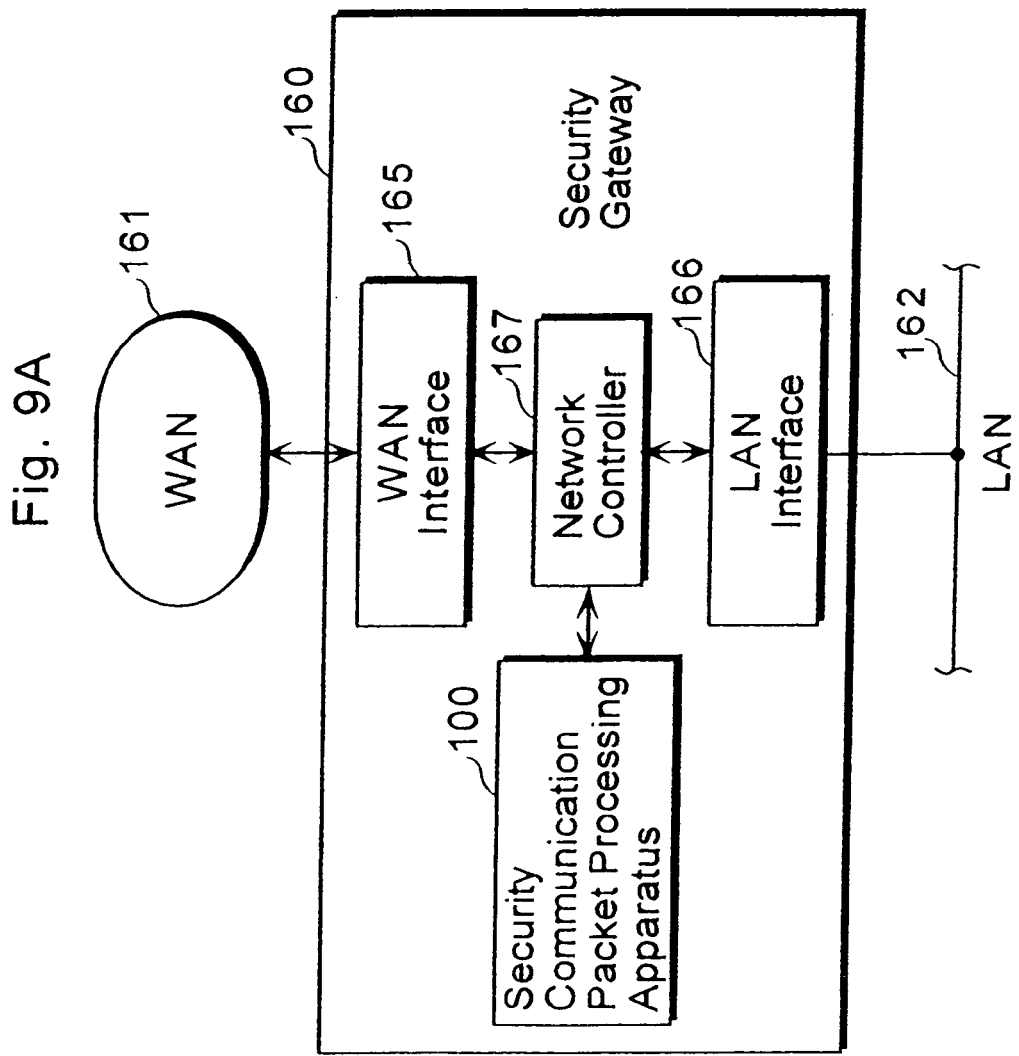
FIG. 9A is a functional block diagram showing a structure of a security gateway as shown in FIG. 8.

FIG. 9A is a functional block diagram showing a structure of the security gateway 160 as shown in FIG. 8, and FIG. 9B shows a protocol stack indicating the communication functions of the security gateway 160. The security gateway 160 comprises the security communication packet processing apparatus 100 of the first embodiment which is realized by an LSI or the like, a WAN interface 165 which is a communication interface connected to the WAN 161, a LAN interface 166 which is a communication interface connected to the LAN 162, and a network controller 167 that converts data inputted and outputted via these two interfaces 165 and 166 according to the protocol stack as shown in FIG. 9B and controls the security communication packet processing apparatus 100 to perform the encryption (or the decryption) processing and the authentication processing to an IP packet.

This security gateway 160 speeds up secret communication via the Internet. Communication speed and security of an Internet phone requiring real time communication, an interactive communication such as an electronic settlement and distribution of a digital work such as a moving image, for example, are dramatically improved.

Note that, according to the security communication packet processing apparatus 100 of the first embodiment, a transfer of data between each component and a data path are determined and controlled under the control of the encryption and authentication processing control unit 101, but instead of this or in addition to this, a transfer of data among the encryption and authentication processing control unit 101, the encryption processing unit 102, the data block accumulation unit 103 and the authentication processing unit 104 may be realized, for example, by two-way hand-shaking between each processing unit.

Also, the security communication packet processing apparatus 100 of the first embodiment may be realized by an LSI and an FPGA (Field Programmable Gate-Array), or the encryption processing unit 102 and the authentication processing unit 104 may be realized by a DSP (Digital Signal Processor).

Further, although the data block accumulation unit 103 is provided independently of the authentication processing unit 104 in the first embodiment, the present invention is not always limited to this structure, and the data block accumulation unit 103 may be realized by being included in the authentication processing unit 104.

Second Embodiment

Next, the security communication packet processing apparatus according to the second embodiment of the present invention will be explained.

FIG. 10 is a block diagram showing a structure of the security communication packet processing apparatus 200 according to the second embodiment of the present invention. The security communication packet processing apparatus 200 of the second embodiment is an example of an apparatus that has two or more encryption processing units and/or authentication processing units, and has the same number of the data block accumulation units as that of the encryption processing units. Here, the second embodiment has a structure in which a pair of combinations of one encryption processing unit, one data block accumulation unit and one authentication processing unit (hereinafter referred to as "a packet processing module") are arranged in parallel, that is, a structure corresponding to two units of the security communication packet processing apparatus 100 according to the first embodiment. More specifically, the security communication packet processing apparatus 200 comprises a first packet processing module including an encryption processing unit 202a, a data block accumulation unit 203a, an authentication processing unit 203a and a packet construction unit 205a, a second packet processing module including an encryption processing unit 202b, a data block accumulation unit 203b, an authentication processing unit 204b and a packet construction unit 205b, and an encryption and authentication processing control unit 201.

Note that the encryption processing units 202a, 202b, the data block accumulation units 203a, 203b, the authentication processing units 204a, 204b, and the packet construction units 205a, 205b have the same functions as the encryption processing unit 102, the data block accumulation unit 103, the authentication unit 104 and the packet construction unit 105 according to the first embodiment, respectively. Further, ID numbers are allocated to the encryption processing units 202a, 202b, the authentication processing units 204a, 204b and the data block accumulation units 203a, 203b respectively so as to identify them uniquely. The second embodiment, particularly the points that are different from the first embodiment, will be explained as follows.

The encryption and authentication processing control unit 201 has a control function to use effectively two pairs of packet processing modules as resources in addition to the functions of the encryption and authentication processing unit 101 of the first embodiment. More specifically, the encryption and authentication processing control unit 201 keeps track of the processing status such as whether the respective processing units 202a–205a and 202b–205b are performing processing (BUSY) or are ready for processing (READY) by receiving BUSY signals indicating that they are performing processing and READY signals indicating that they are ready for processing from the respective processing units. Here, when both of the two encryption processing units 202a and 202b are ready for processing, the encryption processing unit with the smallest ID number is used by priority. The same applies to when the two authentication processing units are ready for processing at the same time.

However, when the encryption processing is performed to a transmitting packet that requires both encryption processing and authentication processing (first type), in the encryption processing unit 202b, for example, the encryption and authentication processing control unit 201 controls so that the encrypted data blocks outputted from the encryption processing unit 202b are inputted to the authentication processing unit 204b after the encrypted data blocks are accumulated in the data block accumulation unit 203b and reconstructed in the packet construction unit 205b. That is, for a transmitting packet that requires both encryption processing and authentication processing, the data block accumulation unit, the authentication processing unit and the packet construction unit for the processing thereof are self-determined depending upon which encryption processing unit 202a or 202b performed the processing. In sum, encryption (or decryption) processing, accumulation of data blocks, authentication processing and reconstruction of a packet are performed by the processing units in the same packet processing module.

Figure 11:
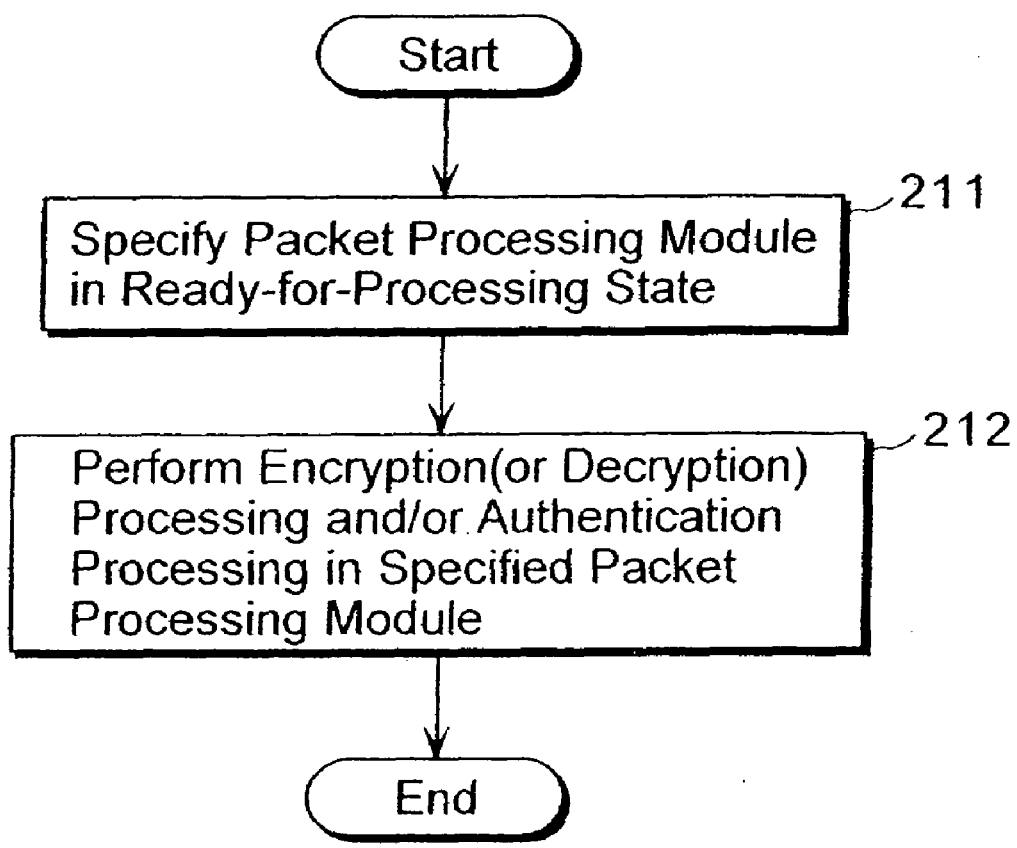
FIG. 11 is a flowchart showing an operation procedure of the security communication packet processing apparatus of the second embodiment.

FIG. 11 is a flowchart showing an operation procedure of the security communication packet processing apparatus 200. When the encryption and authentication processing control unit 201 receives a packet that requires the encryption processing, the authentication processing or both of the encryption and authentication processing and the processing information thereof, the encryption and authentication processing control unit 201 specifies the encryption processing unit 202a or 202b which is ready for processing when the packet requires the encryption processing, and outputs the received packet (the divided data blocks) and the processing information thereof to the encryption processing unit 202a or 202b. On the other hand, when the packet requires the authentication processing only, the encryption and authentication processing control unit 201 specifies the authentication processing unit 204a or 204b which is ready for processing, and outputs the packet (the divided data blocks) and the processing information thereof to the authentication processing unit 204a or 204b (Step 211). The following encryption (or decryption) processing and authentication processing are performed according to the method as described in the first embodiment, that is, the procedure along with any of the four types of data paths depending upon the type of the packet (Step 212).

As described above, according to the security communication packet processing apparatus 200 of the second embodiment, two or more encryption processing units and/or authentication processing units are provided, plural packets are allocated to the encryption processing units or the authentication processing units in an idle condition by the encryption and authentication processing control unit, and the encryption processing and authentication processing are performed to the plural packets in parallel. Therefore, a problem can be avoided that plural packets which require the encryption processing or the authentication processing are sequentially inputted to a single packet processing module of which packet is in a ready-for-processing state and a transmission delay is caused, and thereby the transmission speed of secret communication is improved.

Note that although, according to second embodiment, a structure in which a pair of combinations of an encryption processing unit, an authentication processing and a data block accumulation unit are arranged in parallel is explained, the present invention is not always limited to the above-mentioned structure. A structure in which the encryption processing units and the authentication processing units are provided so that the sum of the processing performance of the encryption processing units is equal to that of the authentication processing units may be realized. In this case, the ratio of the number of the encryption processing units and the authentication processing units is found by the number of the encryption processing units. That is, the number of the authentication processing units=$nT1:T2$, when a size of a data block for the encryption processing is B1, a size of a data block for the authentication processing is B2 (=nB1), the number of processing steps per one block of the encryption processing unit is T1, and the number of processing steps per one block of the authentication processing unit is T2. Note that B, n, T1 and T2 are all natural numbers.

Third Embodiment

Next, the security communication packet processing apparatus according to the third embodiment of the present invention will be explained.

Figure 12:
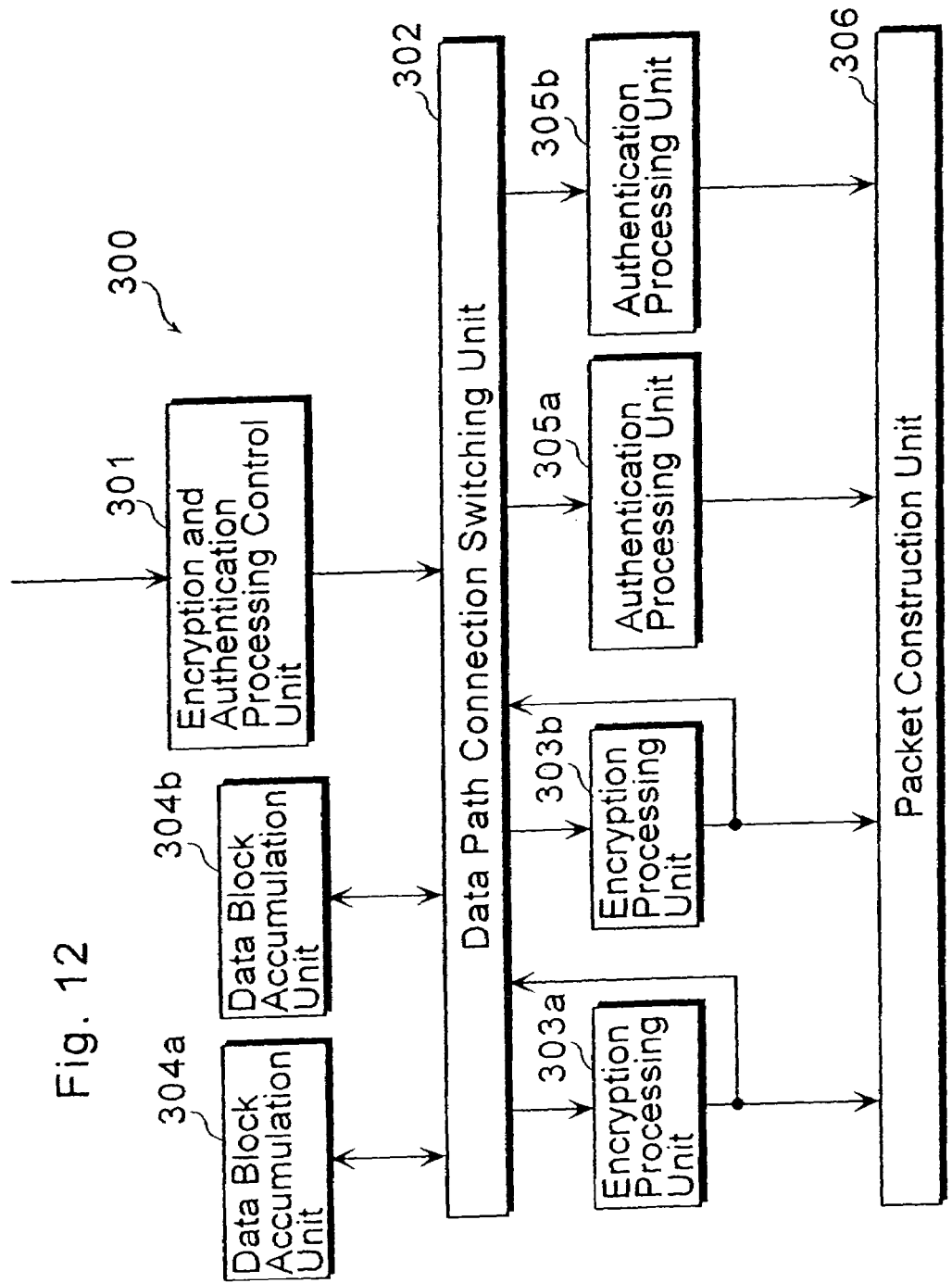
FIG. 12 is a block diagram showing a structure of the security communication packet processing apparatus according to the third embodiment of the present invention.

FIG. 12 is a block diagram showing a structure of the security communication packet processing apparatus 300 according to the third embodiment of the present invention. The security communication packet processing apparatus 300 of the third embodiment is an example of an apparatus which is characterized by having plural encryption processing units, plural data block accumulation units and plural authentication processing units, where a manner of connecting the processing units is not fixed and can be dynamically determined. The security communication packet processing apparatus 300 comprises one encryption and authentication processing control unit 301, one data path connection switching unit 302, two encryption processing units 303a, 303b, two data block accumulation units 304a, 304b, two authentication processing units 305a, 305b, and one packet construction unit 306.

Note that the encryption processing units 303a, 303b, the data block accumulation units 304a, 304b, the authentication processing units 305a, 305b, and the packet construction units 306 have the same functions as those of the encryption processing unit 102, the data block accumulation unit 103, the authentication processing unit 104 and the packet construction unit 105 according to the first embodiment. Further, ID numbers are allocated to the encryption processing units 303a, 303b, the authentication processing units 305a, 305b, and the data block accumulation units 304a, 304b respectively so as to identify them uniquely. The third embodiment, particularly the points that are different from the first embodiment, will be explained as follows.

The data path connection switching unit 302 is a selector circuit or the like that, according to the control of the encryption and authentication processing control unit 301, can connect (or leave unconnected) the output of the encryption and authentication processing control unit 301 and the input of the encryption processing unit 303a or 303b, the output of the encryption and authentication processing control unit 301 and the input of the authentication processing unit 305a or 305b, the output of the encryption processing unit 303a and the input of the data block accumulation unit 304a or 304b, the output of the encryption processing unit 303b and the input of the data block accumulation unit 304a or 304b, the output of the data block accumulation unit 304a and the input of the authentication processing unit 305a or 305b, the output of the data block accumulation unit 304b and the input of the authentication processing unit 305a or 305b, respectively and independently.

The encryption and authentication processing control unit 301 has a function to control the data path connection switching unit 302 so that only the necessary ones among the components are connected dynamically in order to use six components 303a, 303b, 304a, 304b, 305a and 305b effectively as resources, in addition to the functions of the encryption and authentication processing control unit 101 of the first embodiment.

Figure 13:
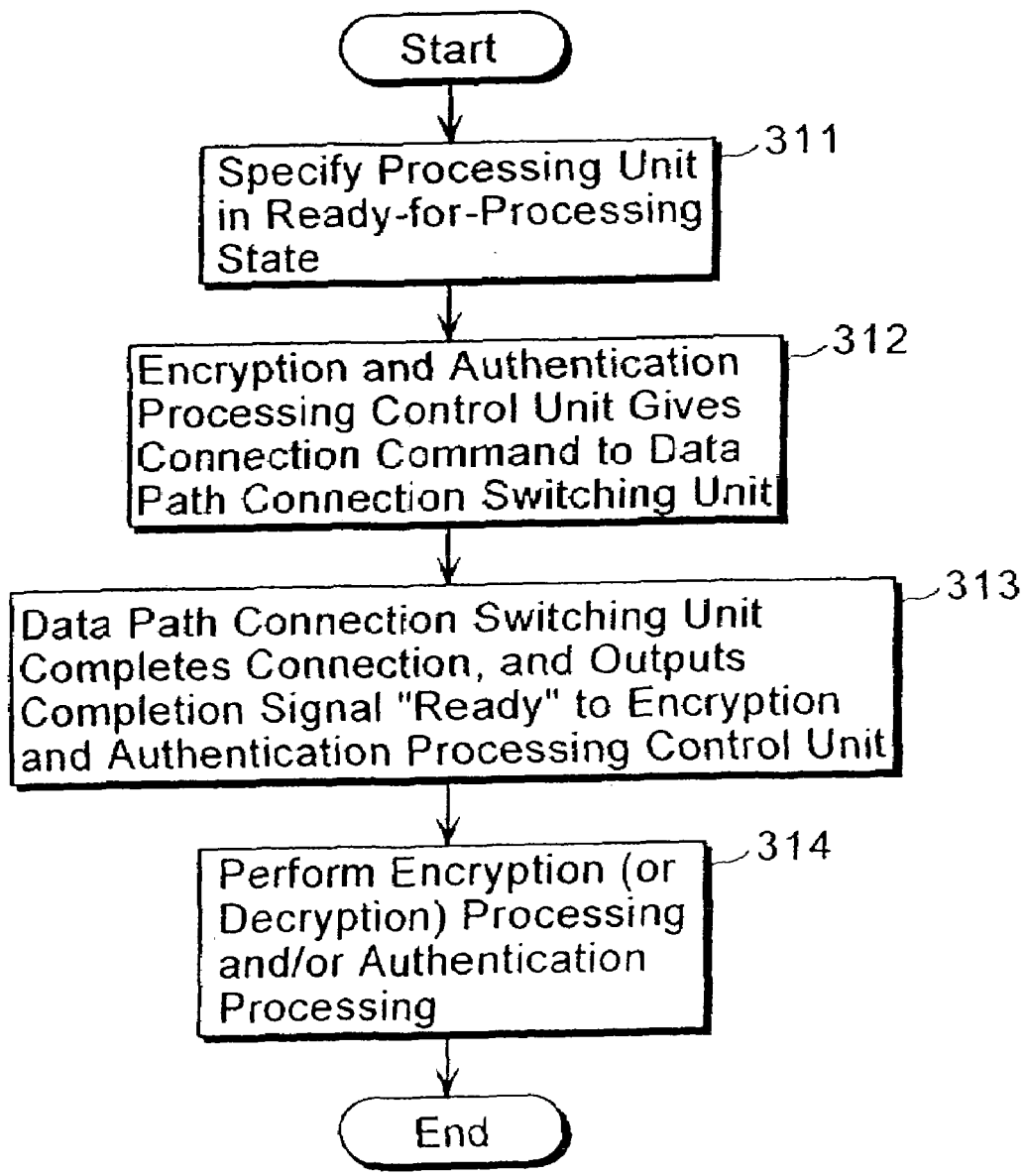
FIG. 13 is a flowchart showing an operation procedure of the security communication packet processing apparatus of the third embodiment.

FIG. 13 is a flowchart showing an operation procedure of the security communication packet processing apparatus 300. The encryption and authentication processing control unit 301 receives a packet which should be processed and the processing information thereof from the outside, judges a type of the packet, that is, the need for the encryption (or the decryption) processing and authentication processing respectively based on the contents of the processing information, and specifies the encryption processing unit 303a or 303b, the data block accumulation unit 304a or 304b, and the authentication processing unit 305a or 305b that can perform the necessary processing (or are ready for processing) (Step 311).

Then, the encryption and authentication processing unit 301 gives a connection command to the data path connection switching unit 302 so that each of the specified processing units is connected in the manner depending upon its packet type (Step 312). Here, the "connection command" may be something expressed by an ID number of each processing unit to be connected or like a control signal of a selector. When it is judged that the packet is a transmitting packet of the first type, the encryption and authentication processing control unit 301 gives the data path connection switching unit 302 a command of connecting the output of the encryption and authentication processing control unit 301 and the input of the encryption processing unit 303b, a command of connecting the output of the encryption processing unit 303b and the input of the data block accumulation unit 304b, and a command of connecting the output of the data block accumulation unit 304b and the input of the authentication processing unit 305b.

On the other hand, when the connection is completed, the data path connection switching unit 302 outputs a READY signal indicating the completion of the connection to the encryption and authentication processing control unit 301 (Step 313).

When the encryption and authentication processing control unit 301 receives the READY signal, the encryption and authentication processing control unit 301 divides the packet to be processed into data blocks which are required for processing, and outputs the data blocks along with the processing information thereof to each processing unit 303a, 303b, 305a and 305b via the data path connection switching unit 302. Thereby, the necessary encryption (or decryption) processing and the necessary authentication processing and the reconstruction of the packet are performed according to the processing procedure as described in the first embodiment (Step 314).

Next, the detailed operations of the 4 types of packets as described in the first embodiment when they are inputted to the security communication packet processing apparatus 300 will be explained by each packet type.

First, the processing process when the first type packet, that is, a transmitting packet that requires both encryption processing and authentication processing, is inputted to the security communication packet processing apparatus 300 is explained. As the first step, the encryption and authentication processing control unit 301 receives a packet to be processed and the processing information thereof, judges that the received packet is a transmitting packet that requires both encryption processing and authentication processing based on the contents of the processing information, and judges which of the encryption processing units, the data block accumulation units and the authentication processing units are ready for processing according to the method as described in the second embodiment.

Here, when the encryption processing unit 303b, the data block accumulation unit 304b and the authentication processing unit 305b are ready for processing, for example, the encryption and authentication processing unit 301, as the second step, gives the data path connection switching unit 302 a command of connecting the output of the encryption and authentication processing control unit 301 and the input of the encryption processing unit 303b, a command of connecting the output of the encryption processing unit 303b and the input of the data block accumulation unit 304b and a command of connecting the output of the data block accumulation unit 303b and the input of the authentication processing unit 305b.

On the other hand, as the third step, the data path connection switching unit 302 connects the respective processing units according to the given connection commands, and after completing the connection, the data path connection switching unit 302 outputs a READY signal indicating the completion of the connection to the encryption and authentication processing control unit 301.

As the fourth step, when the encryption and authentication processing control unit 301 receives the READY signal from the data bath connection switching unit 302, the encryption and authentication processing control unit 301 divides the packet to be processed into data blocks for the encryption processing, and outputs the data blocks along with the processing information thereof to the encryption processing unit 303*b*. The following processing is performed according to the processing method for a transmitting packet of the first type as described in the first embodiment.

Next, the processing process in the case where a packet of the second type, that is, a receiving packet that requires both decryption processing and authentication processing, is inputted to the security communication packet processing apparatus 300 is explained. As the first step, the encryption and authentication processing control unit 301 receives a packet to be processed and the processing information thereof, judges that the packet is a receiving packet that requires both decryption processing and authentication processing based on the contents of the processing information, and judges which of the decryption units and the authentication processing units are ready for processing.

Here, when the encryption processing unit 303*b* and the authentication processing unit 305*b* are ready for processing, for example, the encryption and authentication processing unit 301, as the second step, gives the data path connection switching unit 302 a command of connecting the output of the encryption and authentication processing control unit 301 and the input of the encryption processing unit 303*b* and a command of connecting the output of the encryption and authentication processing control unit 301 and the input of the authentication processing unit 305*b*.

As the third step, the data path connection switching unit 302 connects the encryption and authentication processing control unit 301 and the encryption processing unit 303*b*, and the encryption and authentication processing control unit 301 and the authentication processing unit 305*b* according to the given connection commands. After completing the connection, the data path connection switching unit 302 outputs a READY signal to the encryption and authentication processing control unit 301.

As the fourth step, the encryption and authentication processing control 301 duplicates the packet in the same manner as that described in the first embodiment, divides one packet into data blocks for the encryption processing to output them to the encryption processing unit 303*b*, and divides the other packet into data blocks for the authentication processing to output them to the authentication processing unit 305*b*. The following processing is performed according to the processing method for a packet of the second type as described in the first embodiment.

Next, the processing process in the case where the third type packet, that is, a packet that requires either encryption processing or decryption processing, is inputted to the security communication packet processing apparatus 300 is explained. As the first step, the encryption and authentication processing control unit 301 receives a packet to be processed and the processing information thereof, judges that the received packet is a packet that requires either encryption processing or decryption processing based on the contents of the processing information, and judges which encryption processing unit is ready for processing.

Here, when the encryption processing unit 303*b* is ready for processing, for example, the encryption and authentication processing unit 301, as the second step, gives the data path connection switching unit 302 a command of connecting the output of the encryption and authentication processing control unit 301 and the input of the encryption processing unit 303*b*.

As the third step, the data path connection switching unit 302 connects the encryption and authentication processing control unit 301 and the encryption processing unit 303*b* according to the given connection command. After completing the connection, the data path connection switch 302 outputs a READY signal to the encryption and authentication processing control unit 301.

As the fourth step, the encryption and authentication processing control 301 divides the packet into data blocks for the encryption processing to output the data blocks to the encryption processing unit 303*b*. The following processing is performed according to the processing method for a packet of the third type as described in the first embodiment.

Finally, the processing process in the case where the fourth type packet, that is, a packet that requires only the authentication processing, is inputted to the security communication packet processing apparatus 300 is explained. As the first step, the encryption and authentication processing control unit 301 receives a packet to be processed and the processing information thereof, judges that the received packet is a packet that requires the authentication processing based on the contents of the processing information, and judges which authentication processing unit is ready for processing.

Here, when the authentication processing unit 305*b* is ready for processing, for example, the encryption and authentication processing unit 301, as the second step, gives the data path connection switching unit 302 a command of connecting the output of the encryption and authentication processing control unit 301 and the input of the authentication processing unit 305*b*.

As the third step, the data path connection switching unit 302 connects the encryption and authentication processing control unit 301 and the authentication processing unit 305*b* according to the given connection command. After completing the connection, the data path connection switching unit 302 outputs a READY signal to the encryption and authentication processing control unit 301.

As the fourth step, the encryption and authentication processing control 301 divides the packet into data blocks for the encryption processing to output the data blocks to the authentication processing unit 305*b*. The following processing is performed according to the processing method for a packet of the fourth type as described in the first embodiment.

As described above, according to the security communication packet processing apparatus 300 according to the third embodiment, by providing the data path connection switching unit 302 for connecting respective processing units via various paths, a flexible structure is realized so that an encryption processing unit can input data blocks to an arbitrary data block accumulation unit which is ready for processing and a data block accumulation unit can input data blocks to an arbitrary authentication processing unit which is ready for processing, because a set of one encryption processing unit, one data block accumulation unit and one authentication processing unit are not always occupied fixedly. That is, since the encryption processing unit, the data block accumulation unit and the authentication processing unit can be combined flexibly, they can be effectively used. Further, such operations can be easily realized as providing plural encryption processing units and authentication processing units, or replacing the encryption processing unit mounting an encryption algorithm with the encryption processing unit mounting another encryption algorithm.

Fourth Embodiment

Next, the security communication packet processing apparatus according to the fourth embodiment of the present invention will be explained.

Figure 14:
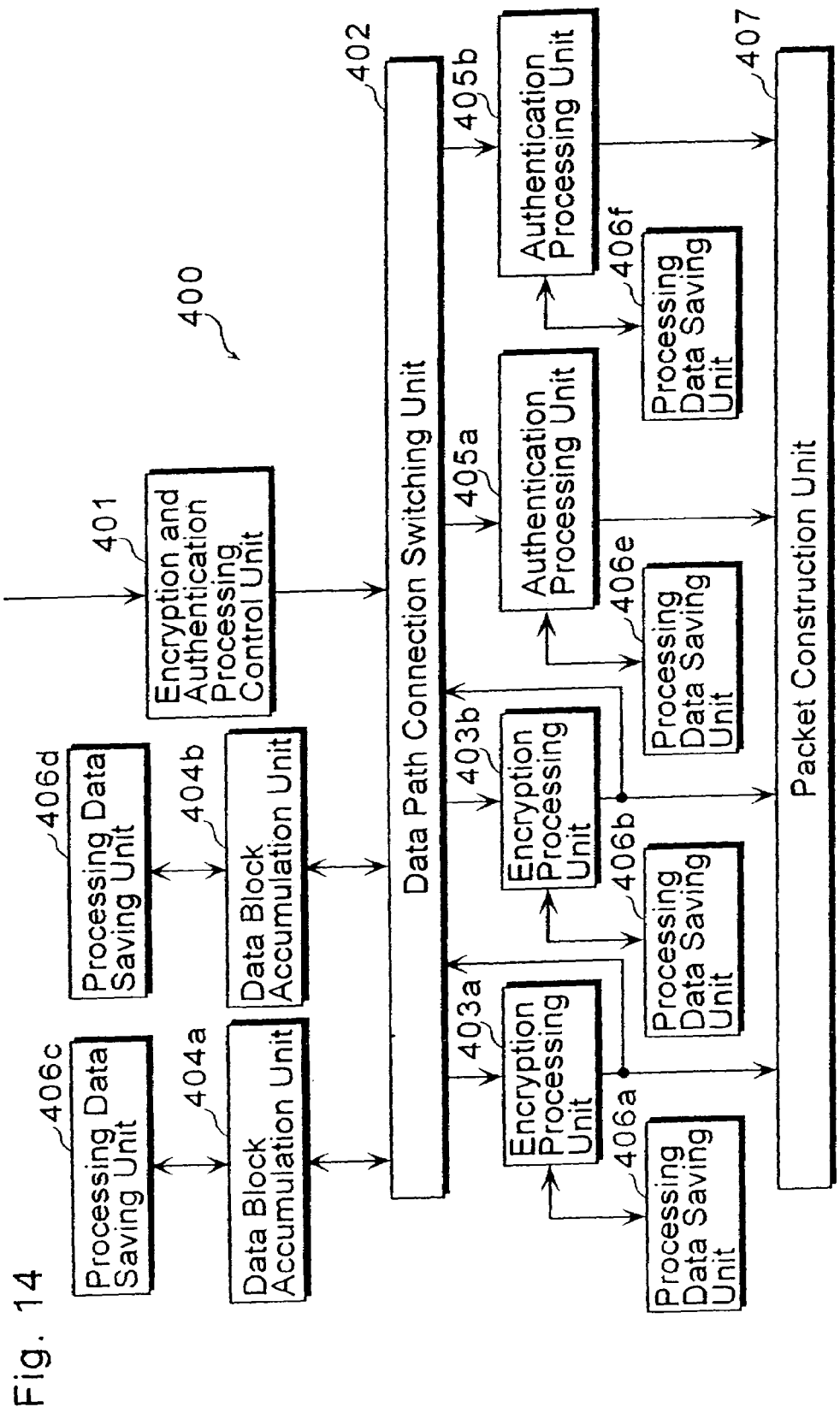
FIG. 14 is a block diagram showing a structure of the security communication packet processing apparatus according to the fourth embodiment of the present invention.

FIG. 14 is a block diagram showing a structure of the security communication packet processing apparatus 400 according to the fourth embodiment of the present invention. The security communication packet processing apparatus 400 according to the fourth embodiment comprises a structure in which six saving areas (or processing data saving units), which are respectively connected to two encryption processing units, two data block accumulation units and two authentication units, are added to the security communication packet processing apparatus 300 according to the third embodiment. In other words, the security communication packet processing apparatus 400 comprises one encryption and authentication processing control unit 401, one data path connection switching unit 402, two encryption processing units 403a and 403b, two data block accumulation units 404a and 404b, two authentication processing units 405a and 405b, six processing data saving units 406a, 406b, 406c, 406d, 406e and 406f, and one packet construction unit 407. The fourth embodiment, particularly the points that are different from the third embodiment, will be explained as follows.

The six processing data saving units 406a, 406b, 406c, 406d, 406e and 406f are memories or the like having storage areas just for temporarily saving all of the data that are being processed in the corresponding encryption processing units 403a, 403b, the data block accumulation units 404a, 404b, and the authentication processing units 405a, 405b, respectively.

Note that, although, according to the fourth embodiment, the encryption and authentication processing control unit 401 receives four types of the packets and the processing information thereof as described in the first embodiment, the processing information is supposed to include the information on the priority of processing the packets. "The information on the priority" is expressed by figures, for example. These figures are allocated corresponding to the information of the Type of Service (ToS) bits included in an IP header, for example.

The encryption and authentication processing control unit 401 performs processing for allocating resources (that is, the encryption processing unit, the data block accumulation unit and the authentication processing unit) depending upon the priority of the inputted packet, in addition to the functions of the encryption and authentication processing control unit 301. More specifically, when all the resources which are required for the encryption (or the decryption) processing and the authentication processing are being occupied when the packet is inputted, the encryption and authentication processing control unit 401 specifies the resource which is processing the packet with the lowest priority among them and saves the processing data thereof in the processing data saving unit so as to release the resource. In other words, the encryption and authentication processing control unit 401 performs control so that the packet with higher priority is processed earlier.

Figure 15:
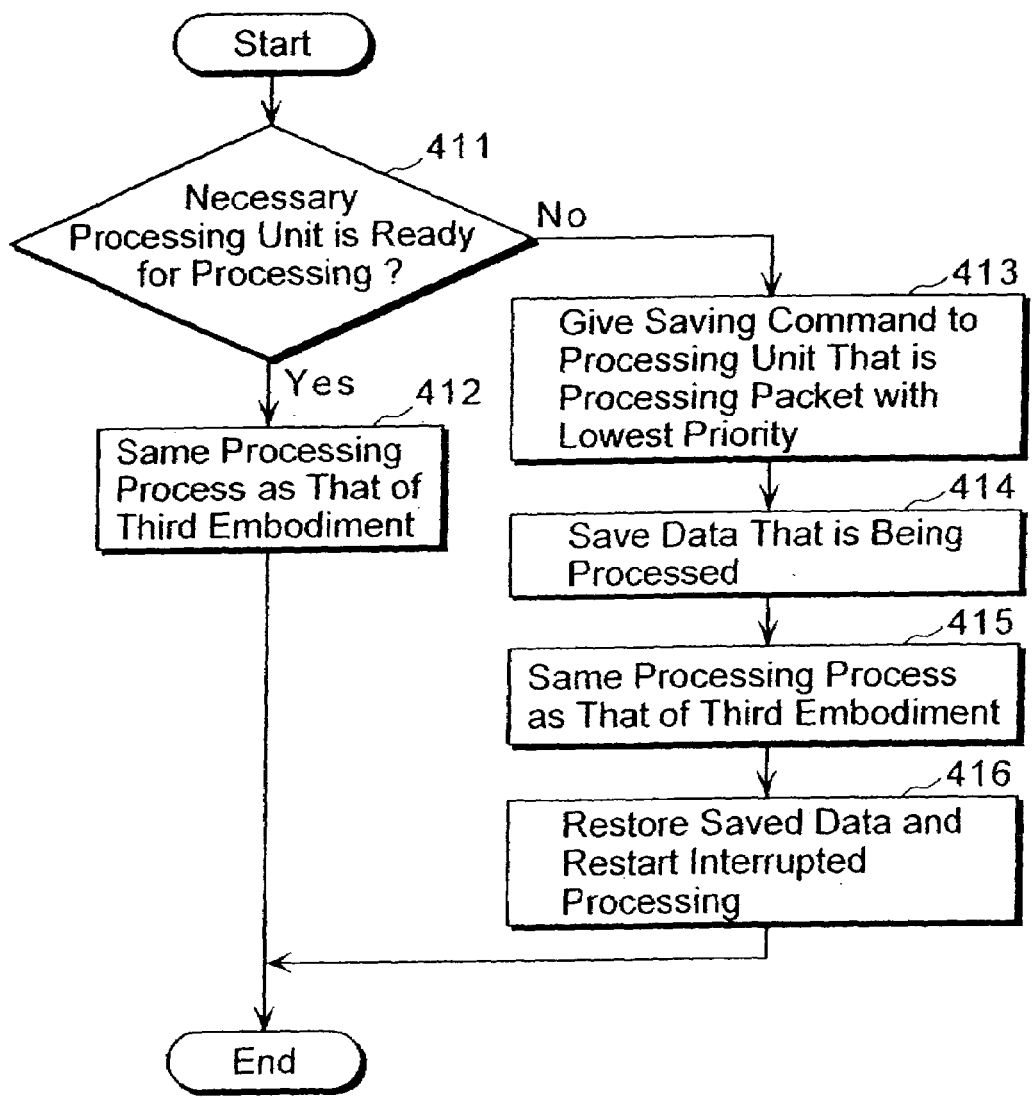
FIG. 15 is a flowchart showing an operation procedure of the security communication packet processing apparatus of the fourth embodiment.

FIG. 15 is a flowchart showing an operation procedure of the security communication packet processing apparatus 400.

The encryption and authentication processing control unit 401 receives a packet to be processed and the processing information thereof, and then judges whether or not the processing unit required for the processing of the packet is ready for processing based on the processing information (Step 411). As a result, when the required processing unit is ready for processing ("Yes" in Step 411), the encryption and authentication processing control unit 401 outputs the data blocks and the processing information thereof to the processing unit and makes the processing unit proceed with the processing (Step 412) according to the processing process of the third embodiment (Steps 311–314 in FIG. 13) in the following.

On the other hand, when all the processing units which are required for the processing of the packet are being occupied ("No" in Step 411), the encryption and authentication processing control unit 401 gives the processing unit which is processing the packet with the lowest priority a command of saving the data in the middle of processing in the processing data saving unit that is connected to this processing unit (Step 413). When the processing unit which is processing the packet with the lowest priority receives the saving command, the processing unit saves the data in the middle of processing and the processing information thereof in the processing data saving unit, and after completing the saving, the processing unit outputs a READY signal to the encryption an authentication processing control unit 401 (Step 414).

When the encryption and authentication processing control unit 401 receives the READY signal, the encryption and authentication processing control unit 401 outputs data blocks and the processing information thereof to the processing unit, and makes the processing unit proceed with the processing (Step 415) according to the processing process of the third embodiment (Steps 311–314 in FIG. 13) in the following. After all the processing for the packet which was processed by priority is completed, the processing unit reads out the data in the middle of processing from the processing data saving unit and restarts the processing for the packet (Step 416).

As described above, according to the security communication packet processing apparatus 400 of the fourth embodiment, the processing data saving units 406a, 406b, 406c, 406d, 406e and 406f are provided in addition to the structure of the third embodiment. Therefore, control of processing packets by priority becomes possible in addition to the effects as described in the third embodiment.

Note that although the processing data saving units are respectively provided for all the encryption processing units, the data block accumulation units and the authentication processing units, the present invention is not always limited to the above structure. The processing data saving units may be provided for all the encryption processing units only, for example. That is, the processing data saving units may be provided respectively for arbitrary processing units. Also, the fourth embodiment can be applied to the security communication packet processing apparatus 200 according to the second embodiment. The processing in this case can be realized in the same manner as the above.

Further, according to the fourth embodiment, when all the required processing units are being occupied when a packet is inputted to the encryption and authentication processing control unit 401, the processing unit which is processing the packet with the lowest priority among the packets in the middle of processing is released compulsorily regardless of the priority of the inputted packet, but the correlation with the priority of the inputted packet may be added as a condition of releasing. That is, the processing unit which is processing the packet with the lower priority than that of the inputted packet and the lowest priority among the packets in the middle of processing may be released compulsorily, for example.

Further, as a parameter for determining the processing unit which is to be released compulsorily, not only priority of a packet but also a packet size, the number of steps which are required for processing, the number of remaining steps until the processing of the packets in the middle of the processing is completed and so on may be used.

Fifth Embodiment

Next, the security communication packet processing apparatus according to the fifth embodiment of the present invention will be explained.

Figure 16:
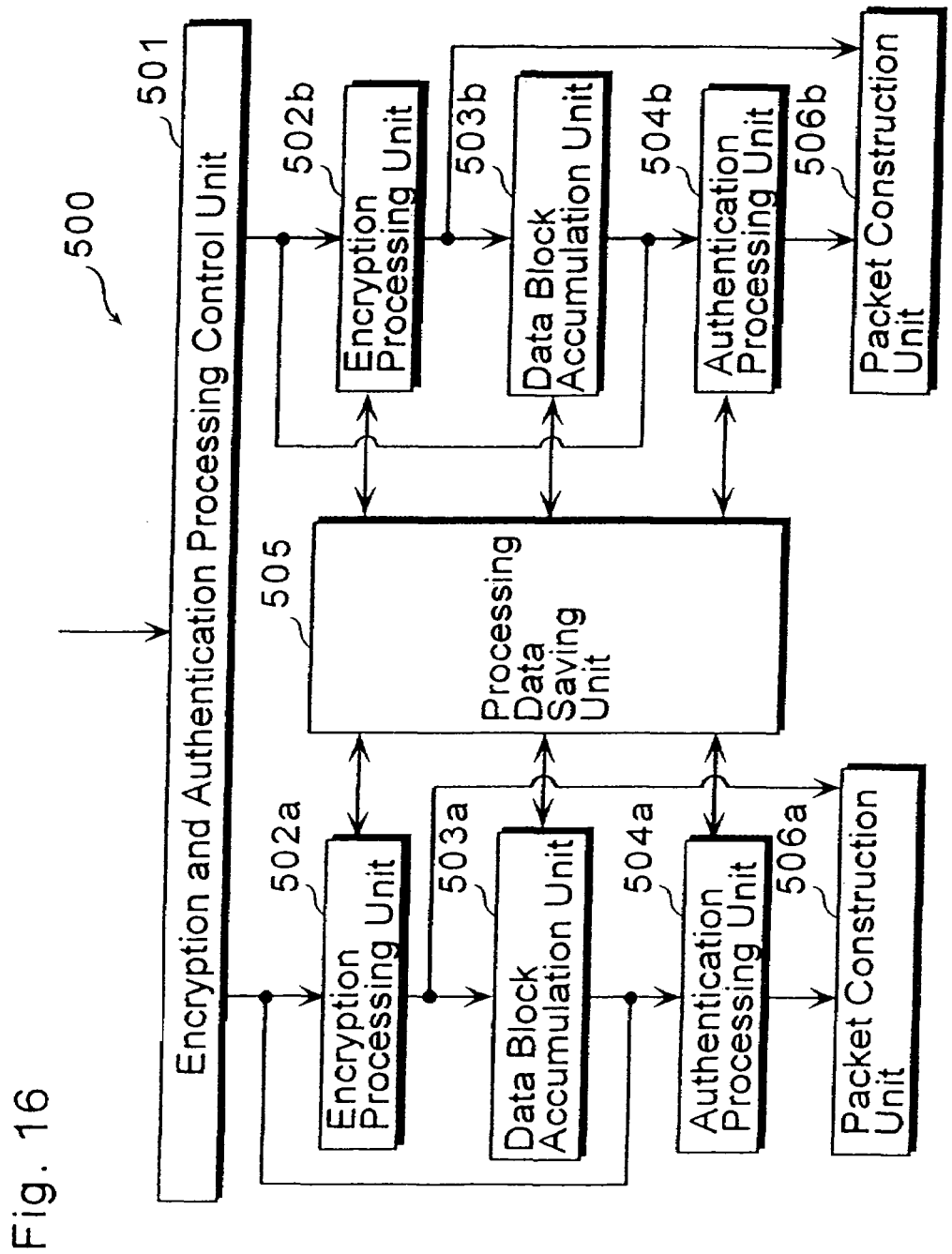
FIG. 16 is a block diagram showing a structure of the security communication packet processing apparatus according to the fifth embodiment of the present invention.

FIG. 16 is a diagram showing a structure of the security communication packet processing apparatus 500 according to the fifth embodiment of the present invention. The security communication packet processing apparatus 500 according to the fifth embodiment comprises a structure in which a data saving area (a processing data saving unit) which is common to (shared by) two encryption processing units, two data block accumulation units and two authentication processing units is added to the security communication packet processing apparatus 200 according to the second embodiment. In other words, the security communication packet processing apparatus 500 comprises the packet processing module including an encryption processing unit 502a, a data block accumulation unit 503a, an authentication processing unit 504a and a packet construction unit 506a, the packet processing module including an encryption processing unit 502b, a data block accumulation unit 503b, an authentication processing unit 504b and a packet construction unit 506b, an encryption and authentication processing control unit 501, and a processing data saving unit 505.

The processing data saving unit 505 is a memory or the like that is connected to the encryption processing units 502a and 502b, the data block accumulation units 503a and 503b, and the authentication processing units 504a and 504b, and has a memory area just for temporarily saving all of the data in the middle of processing in these processing units.

Note that although, according to the fifth embodiment, the encryption and authentication processing control unit 501 receives four types of packets as described in the first embodiment and the processing information thereof in the same manner as the fourth embodiment, the processing information is supposed to include the information on the priority of processing the packets.

The encryption and authentication processing control unit 501 performs processing for allocating resources (packet processing modules) depending upon the priority of the inputted packet, in addition to the functions of the encryption and authentication processing control unit 201 according to the second embodiment. More specifically, when all the resources which are required for the encryption (or the decryption) processing and the authentication processing are being occupied when the packet is inputted, the encryption and authentication processing control unit 501 specifies the resource which is processing the packet with the lowest priority among them and saves the data in the middle of processing in the processing data saving unit 505 so as to release the resource. In other words, the encryption and authentication processing control unit 501 performs control so that the packet of the higher priority is processed earlier.

Figure 17:
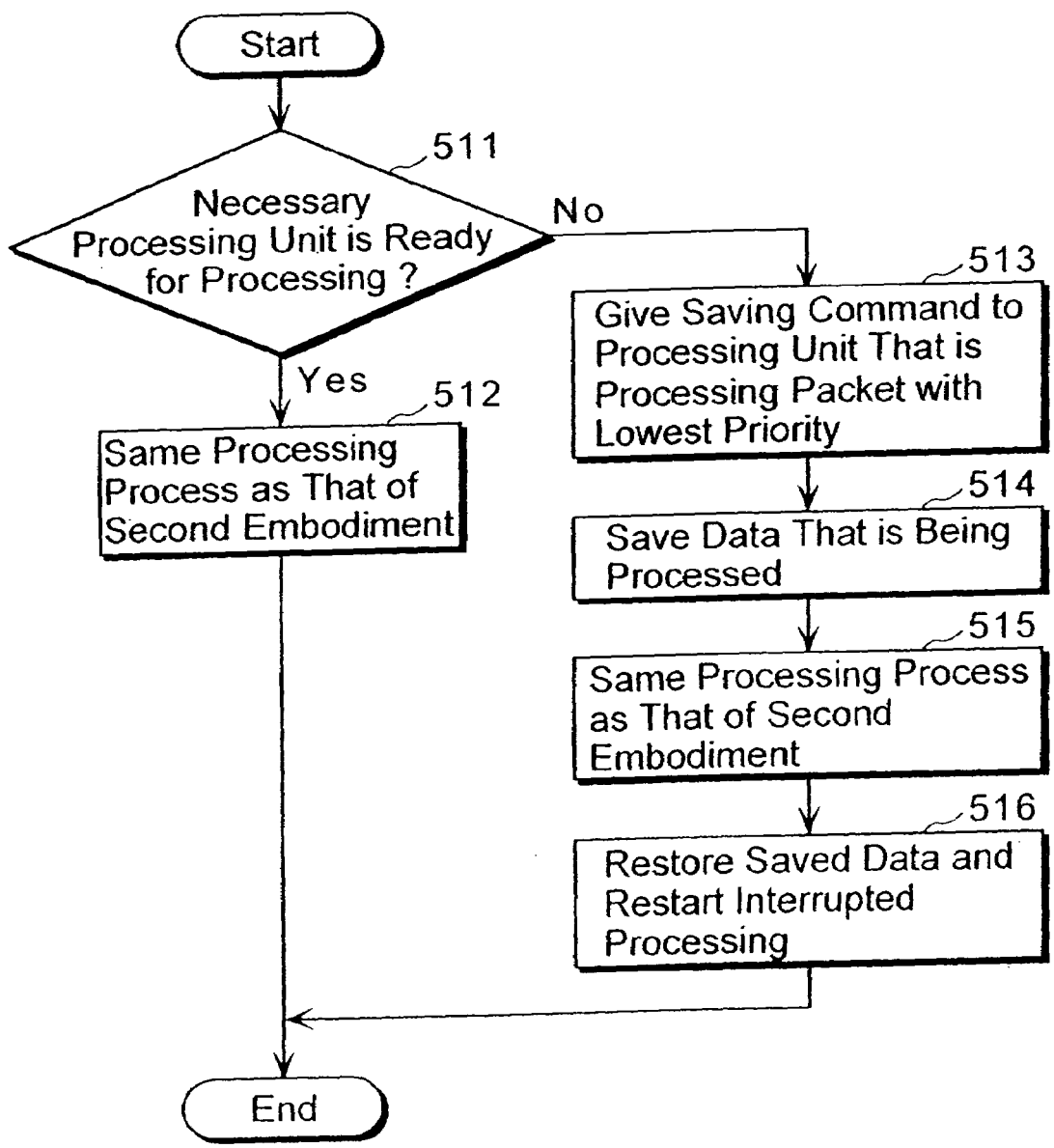
FIG. 17 is a flowchart showing an operation procedure of the security communication packet processing apparatus of the fifth embodiment.

FIG. 17 is a flowchart showing an operation procedure of the security communication packet processing apparatus 500. First, the encryption and authentication processing control unit 501 receives a packet to be processed and the processing information thereof, and then judges whether or not the processing unit which is required for the processing of the packet is ready for processing based on the processing information (Step 511). As a result, when the required processing unit is ready for processing ("Yes" in Step 511), the encryption and authentication processing control unit 501 outputs data blocks and the processing information thereof to the processing unit and makes the processing unit proceed with the processing (Step 512) according to the processing process of the second embodiment (Steps 211–212 in FIG. 11) in the following.

On the other hand, when all the processing units which are required for the processing of the packet are being occupied ("No" in Step 511), the encryption and authentication processing control unit 501 gives the processing unit which is processing the packet with the lowest priority a command of saving the data in the middle of processing along with an address of a saving destination in the processing data saving unit 505 (Step 513). When the processing unit receives the command of saving, the processing unit saves the data in the middle of processing and the processing information thereof in the specified address of the processing data saving unit 505, and after completing the saving, the processing unit outputs a READY signal to the encryption and authentication processing control unit 501 (Step 514).

When the encryption and authentication processing control unit 501 receives the READY signal, the encryption and authentication processing control unit 501 outputs data blocks and the processing information thereof to the processing unit, and makes the processing unit proceed with the processing (Step 515) according to the processing process of the second embodiment (Steps 211–212 in FIG. 11) in the following. After all the processing for the packet which was processed by priority is completed or other processing units reach a ready-for-processing state, the processing unit reads out the saved data in the middle of processing from the processing data saving unit 505 and restarts the processing for the packet (Step 516).

As described above, according to the security communication packet processing apparatus 500 of the fifth embodiment, the processing data saving unit 505 shared by the encryption processing units 502a and 502b, the data block accumulation units 503a and 503b and the authentication processing units 504a and 504b is provided in addition to the structure of the second embodiment. Therefore, in addition to the effects as described in the second embodiment, not only control of processing packets by priority becomes possible, but also a more effective use of the processing data saving unit becomes possible than in the fourth embodiment in which the processing data saving unit is provided so as to be dedicated to each processing unit.

Note that although, according to the fifth embodiment, the processing data saving unit is provided so as to be common to (shared by) all of the encryption processing units, the data block accumulation units and the authentication processing units, the present invention is not always limited to the above structure. The processing data saving unit may be provided for all the encryption processing units only, for example. That is, the processing data saving unit may be provided so as to be common to an arbitrary combination of the processing units.

Figure 18:
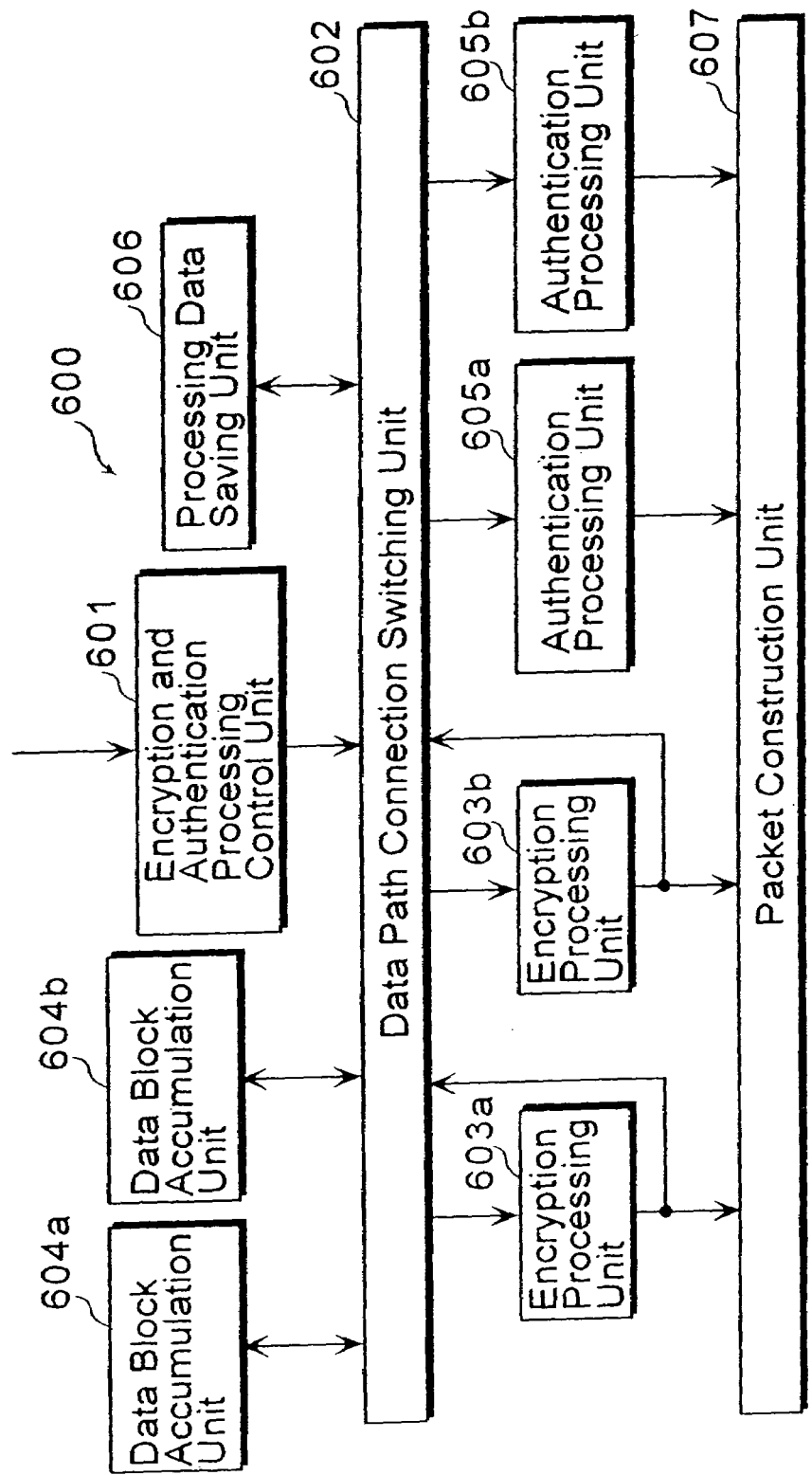
FIG. 18 is a block diagram of the security communication packet processing apparatus as an example of the variation.

Also, the technique for sharing the data saving area according to the fifth embodiment can be applied to the security communication packet processing apparatus 300 according to the third embodiment. More specifically, like the security communication packet processing apparatus 600 as shown in FIG. 18, a data saving area (a processing data saving unit 606) shared by encryption processing units 602*a* and 602*b*, data block accumulation units 603*a* and 603*b* and authentication processing units 604*a* and 604*b* may be added. In this case, an encryption and authentication processing control unit 601 gives a data path connection switching unit 602 a command of connecting the processing unit as a destination of saving the data in the middle of processing and the processing data saving unit 606 so as to make it possible to save the data.

As shown in the above-mentioned five embodiments of the present invention, since a processing unit for performing both encryption (or decryption) processing and authentication processing is a data block size which is necessary and sufficient for the processing according to the present invention, speeding up and reducing delay of the encryption processing and the authentication processing can be realized, as compared with the prior art in which a processing unit is a packet.

Also, when both encryption processing and authentication processing are performed according to the present invention, the data blocks after the encryption processing are accumulated until they reach the size of the data blocks which is necessary and sufficient for the authentication processing, and the authentication processing is performed when the accumulated data blocks become equal to that of the data blocks for the authentication processing. Therefore, the present invention can contribute to the saving of memory resources for buffering the data blocks after the encryption processing.

Also, since two or more encryption processing units and/or authentication processing units are provided according to the present invention, simultaneous processing of plural packets becomes possible and the throughput of the security processing of the packets can thereby be improved.

Further, according to the present invention, by providing the data path connection switch unit, the encryption processing unit, the data block accumulation unit and the authentication processing unit need not always be corresponded fixedly even when there are plural encryption processing units and/or the authentication processing units. That is, since the data blocks requiring the authentication processing after the encryption processing can be outputted to an arbitrary data block accumulation unit, and the output of the data block accumulation unit can be outputted to an arbitrary authentication processing unit, there are effects that more effective use of the encryption processing unit, the data block accumulation unit and the authentication processing unit becomes possible and the encryption processing unit and the authentication processing unit can be easily replaced and the number of them can be easily increased.

Further, by providing the processing data saving unit, the packet processing is not always performed in the order that the packets are inputted to the security communication packet processing apparatus, and the processing order can be manipulated according to the packet priority and others.

Still further, according to the present invention, since an arbitrary encryption processing unit or authentication processing unit that shares the processing data saving unit and is ready for processing can process the data block to be processed when there is any in the processing data saving unit, by sharing the processing data saving unit in an arbitrary combination of the encryption processing units, the authentication processing units and the data block accumulation units, a more effective use of the encryption processing unit and the authentication processing unit becomes possible.

Although the security communication packet processing unit according to the present invention was explained based on the five embodiments, the present invention is not limited to these embodiments.

That is, other embodiments of various manners can be realized by combining features of these five embodiments. For example, the security communication packet processing apparatus in which the processing data saving units are connected dedicatedly to the respective processing units 202*a*, 202*b*, 203*a*, 203*b*, 204*a* and 204*b* of the security communication packet processing apparatus 200 as shown in FIG. 10 can be realized by applying the feature of the fourth embodiment (that is, providing the processing data saving unit for each processing unit) to the second embodiment.

Further, the security communication packet processing apparatus according to the second through fifth embodiments as well as the first embodiment can, of course, be incorporated in a communication device such as a security gateway and a computer device.

INDUSTRIAL APPLICABILITY

The security communication packet processing apparatus according to the present invention is applicable to a communication relay station that connects various communication networks, a security gateway that functions as a router and a firewall, and a communication device that securely connects a WAN that is a public network such as the Internet and a LAN that is a non-public network that connects plural computers for in-house use.

The invention claimed is:

1. A security communication packet processing apparatus that performs at least one of encryption processing, decryption processing and authentication processing on an inputted packet so as to construct a processed packet corresponding to the inputted packet, said security communication packet processing apparatus comprising:
a control unit operable to divide the inputted packet into data blocks each having a B1 bit length, and sequentially output the data blocks obtained by the division, the B1 bit length being a unit of a data block on which one of the encryption processing and the decryption processing is performed;
at least one encryption processing unit operable to perform one of the encryption processing and the decryption processing on the data blocks outputted from said control unit;
at least one authentication processing unit operable to perform the authentication processing on data blocks each having a B2 bit length, and output an authentication value indicating the result of the authentication processing, the B2 bit length being a unit of a data block on which the authentication processing is performed and being n times the data block unit having the B1 bit length;
at least one data block accumulation unit operable to accumulate the data blocks each having the B1 bit length on which the encryption processing has been performed by said at least one encryption processing unit, and, when the number of accumulated encrypted data blocks each having the B1 bit length reaches n, output the data block having the B2 bit length made up of the n data blocks each having the B1 bit length, to said at least one authentication processing unit; and a packet construction unit operable to receive the encrypted or decrypted data blocks from said at least one encryption processing unit, receive the authentication value from said at least one authentication processing unit, and reconstruct, according to a predetermined format, a processed packet corresponding to the inputted packet by using the received data blocks and the authentication value;

wherein when the inputted packet is a packet which requires both encryption processing and authentication processing, the encryption processing of the data block having the B1 bit length by said at least one encryption processing unit and the authentication processing of the data block having the B2 bit length by said at least one authentication processing unit are performed in parallel;

said at least one encryption processing unit is operable to generate encrypted data blocks by performing, one by one, the encryption processing on the data blocks each having the B1 bit length outputted, one by one, from said control unit, and output, one by one, the generated encrypted data blocks to said at least one data block accumulation unit and said packet construction unit;

said at least one data block accumulation unit is operable to accumulate the encrypted data blocks which have been outputted from said at least one encryption processing unit, and when the number of accumulated encrypted data blocks each having the B1 bit length reaches n, output the data block having the B2 bit length made up of the n encrypted data blocks each having the B1 bit length, to said at least one authentication processing unit;

said at least one authentication processing unit is operable to update an intermediate value obtained in the middle of generating the authentication value when said authentication processing unit receives the data block having the B2 bit length from said data block accumulation unit, using the data block having the B2 bit length, and output the intermediate value as the authentication value when said authentication processing unit updates the intermediate value using the at least one data block having the B2 bit length corresponding to the inputted packet; and said packet construction unit is operable to (i) receive, from said at least one encryption processing unit, and accumulate, one by one, the encrypted data blocks corresponding to the data blocks obtained by dividing the inputted packet, (ii) receive the authentication value from said at least one authentication processing unit, and (iii) reconstruct the processed packet by using a set of the accumulated encrypted data blocks and the authentication value.

2. The security communication packet processing apparatus according to claim 1, wherein:

said control unit is operable to judge whether the inputted packet is a first type packet requiring the encryption processing and the authentication processing, a second type packet requiring the decryption processing and the authentication processing, a third type packet requiring one of the encryption processing and the decryption processing, or a fourth type packet requiring the authentication processing only;

when said control unit judges that the inputted packet is the first type packet, said control unit is operable to divide the inputted packet into the data blocks bits each having the B1 bit length and output the divided data blocks each having the B1 bit length sequentially to said at least one encryption processing unit;

when said control unit judges that the inputted packet is the second type packet, said control unit is operable to divide the inputted packet into the data blocks each having the B1 bit length, output the divided data blocks each having the B1 bit length sequentially to said encryption processing unit, divide the inputted packet or a duplicate of the inputted packet into the data blocks each having the B2 bit length, and output the divided data blocks each having the B2 bit length sequentially to said at least one authentication processing unit;

when said control unit judges that the inputted packet is the third type packet, said control unit is operable to divide the inputted packet into the data blocks each having the B1 bit length and output the divided data blocks each having the B1 bith length sequentially to said at least one encryption processing unit; and when said control unit judges that the inputted packet is the fourth type packet, said control unit is operable to divide the inputted packet into the data blocks each having the B2 bit length and output the divided data blocks each having the B2 bit length sequentially to said at least one authentication processing unit.

3. The security communication packet processing unit according to claim 1, wherein:

the number of at least one of said at least one encryption processing unit and said at least one authentication processing unit is two or more; and the number of said at least one data block accumulation unit is equal to the number of said at least one encryption processing unit.

4. The security communication packet processing apparatus according to claim 3, wherein said control unit is operable to specify, among two or more encryption processing units or two or more authentication processing units, said encryption processing unit or said authentication processing unit that is ready for processing, and output the data blocks to the specified encryption processing unit or authentication processing unit.

5. The security communication packet processing apparatus according to claim 1, further comprising a data path connection switching unit operable to connect the output of said control unit and the input of said at least one encryption processing unit, the output of said control unit and the input of said at least one authentication processing unit, the output of said at least one encryption processing unit and the input of said at least one data block accumulation unit, and the output of said at least one data block accumulation unit and the input of said at least one authentication processing unit, respectively and independently.

6. The security communication packet processing apparatus according to claim 5, wherein:

said control unit is operable to judge whether the inputted packet is a first type packet requiring the encryption processing and the authentication processing, a second type packet requiring the decryption processing and the authentication processing, a third type packet requiring one of the encryption processing and the decryption processing, or a fourth type packet requiring the authentication processing only;

when said control unit judges that the inputted packet is the first type packet, said control unit is operable to control said data path connection switching unit so as to connect the output of said control unit and the input of said at least one encryption processing unit, the output of said at least one encryption processing unit and the input of said at least one data block accumulation unit, and the output of said at least one data block accumulation unit and the input of said at least one authentication processing unit;

when said control unit judges that the inputted packet is the second type packet, said control unit is operable to control said data path connection switching unit so as to connect the output of said control unit and the input of said at least one encryption processing unit, and the output of said control unit and the input of said at least one authentication processing unit;

when said control unit judges that the inputted packet is the third type packet, said control unit is operable to control said data path connection switching unit so as to connect the output of said control unit and the input of said at least one encryption processing unit; and when said control unit judges that the inputted packet is the fourth type packet, said control unit is operable to control said data path connection switching unit so as to connect the output of said control unit and the input of said at least one authentication processing unit.

7. The security communication packet processing apparatus according to claim 6, wherein:
the number of at least one of said at least one encryption processing unit and said at least one authentication processing unit is two or more; and
the number of said at least one data block accumulation unit is equal to the number of said at least one encryption processing unit.

8. The security communication packet processing apparatus according to claim 7, wherein said control unit is operable to specify, among two or more encryption processing units or two or more authentication processing units, said encryption processing unit or said authentication processing unit that is ready for processing, and make said data path connection switching unit perform a connection for the specified encryption processing unit or authentication processing unit.

9. The security communication packet processing apparatus according to claim 1, further comprising a processing data saving unit provided for each of at least one of said at least one encryption processing unit, said at least one authentication processing unit and said at least one data block accumulation unit, each processing data saving unit having a memory area, for each processing unit for which said processing data saving unit is provided, for temporarily suspending the processing of at least one data block in the processing unit, and saving the data block which was being processed in the processing unit.

10. The security communication packet processing apparatus according to claim 9, wherein said control unit is operable to specify the processing unit that is performing the processing of the data block of the inputted packet having the lowest priority among the processing units, and, after suspending the processing of the data block in the processing unit and saving the data block which was being processed in the processing unit into said processing data saving unit provided to the processing unit performing the processing of the data block of the inputted packet having the lowest priority, make the processing unit perform the processing of the data block of another inputted packet.

11. The security communication packet processing apparatus according to claim 10, further comprising a data path connection switching unit operable to connect the output of said control unit and the input of said at least one encryption processing unit, the output of said control unit and the input of said at least one authentication processing unit, the output of said at least one encryption processing unit and the input of said at least one data block accumulation unit, and the output of said at least one data block accumulation unit and the input of said at least one authentication processing unit, respectively and independently.

12. The security communication packet processing apparatus according to claim 11, wherein:
the number of at least one of said at least one encryption processing unit and said at least one authentication processing unit is two or more; and
the number of said at least one data block accumulation unit is equal to the number of said at least one encryption processing unit.

13. The security communication packet processing apparatus according to claim 1, further comprising a processing data saving unit provided for each of at least two of said at least one encryption processing unit, said at least one authentication processing unit and said at least one data block accumulation unit, each processing data saving unit having a memory area shared by the processing unit for temporarily suspending the processing of at least one data block in the processing unit and saving the data block which was being processed in the processing unit.

14. The security communication packet processing apparatus according to claim 13, wherein said control unit is operable to specify, among the processing units, the processing unit that is performing the processing of the data block of the inputted packet having the lowest priority, and, after suspending the processing of the data block in the processing unit and saving the data block which was being processed in the processing unit in said processing data saving unit provided to the processing unit performing the processing of the data block of the inputted packet having the lowest priority, make the processing unit perform the processing of the data block of another inputted packet.

15. The security communication packet processing apparatus according to claim 14, further comprising a data path connection switching unit operable to connect the output of said control unit and the input of said at least one encryption processing unit, the output of said control unit and the input of said at least one authentication processing unit, the output of said at least one encryption processing unit and the input of said at least one data block accumulation unit, and the output of said at least one data block accumulation unit and the input of said at least one authentication processing unit, respectively and independently.

16. The security communication packet processing apparatus according to claim 15, wherein:
the number of at least one of said at least one encryption processing unit and said at least one authentication processing unit is two or more; and
the number of said at least one data block accumulation unit is equal to the number of said at least one encryption processing unit.

17. The security communication packet processing apparatus according to claim 1, wherein the B1 is 64, and the B2 is 512.

18. A security communication packet processing method for performing at least one of encryption processing, decryption processing and authentication processing on an inputted packet so as to construct a processed packet corresponding to the inputted packet, said security communication packet processing method comprising:
dividing the inputted packet into data blocks each having a B1 bit length, and sequentially outputting the data blocks obtained by said dividing, the B1 bit length being a unit of a data block on which one of the encryption processing and the decryption processing is performed;
performing the encryption processing or the decryption processing on the data blocks outputted in said outputting;

performing the authentication processing on data blocks each having a B2 bit length, and outputting an authentication value indicating the result of the authentication processing, the B2 bit length being a unit of a data block on which the authentication processing is performed and being n times the data block having the B1 bit length;

accumulating the data blocks each having the B1 bit length on which the encryption processing has been performed in said performing of the encryption processing, and when the number of accumulated encrypted data blocks each having the B1 bit length reaches n, outputting the data block having the B2 bit length made up of the n data blocks each having the B1 bit length so that the data block the having the B2 bit length is processed in said performing of the authentication processing:

receiving the data blocks encrypted or decrypted in said performing of the encryption processing or said performing of the decryption processing, receiving the authentication value outputted in said outputting of the authentication value, and reconstructing, according to a predetermined format, a processed packet corresponding to the inputted packet by using the received data blocks and the authentication value, wherein:

when the inputted packet is a packet which requires both encryption processing and authentication processing, the encryption processing of the data block having the B1 bit length performed in said performing of the encryption processing and the authentication processing of the data block having the B2 bit length performed in said performing of the authentication processing are performed in parallel in said performing of the encryption processing, encrypted data blocks are generated by performing, one by one, the encryption processing on the data blocks each having the B1 bit length outputted one by one in said outputting of the data blocks, and the generated encrypted data blocks are outputted one by one so that the data blocks are processed in both of i) said accumulating of the data blocks each having the B1 bit length and outputting of the data block having the B2 bit length, and ii) said reconstructing of the processed packet;

in said accumulating of the data blocks each having the B1 bit length and outputting of the data block having the B2 bit length, the encrypted data blocks which have been outputted in said performing of the encryption processing are accumulated, and when the number of accumulated encrypted data blocks each having the B1 bit length reaches n, the data block having B2 the bit length made up of the n encrypted data blocks each having the B1 bit length is outputted so that the data block having the B2 bit length is processed in said performing of the authentication processing;

in said performing of the authentication processing, an intermediate value obtained in the middle of generating the authentication value is updated using the data block having the B2 bit length, when the data block having the B2 bit length accumulated in said accumulating is received, and the intermediate value is outputted as the authentication value when the intermediate value is updated using the at least one data block having the B2 bit length corresponding to the inputted packet; and in said reconstructing, (i) the encrypted data blocks obtained in said performing of the encryption processing and corresponding to the data blocks obtained by dividing the inputted packet are received and accumulated one by one, (ii) the authentication value generated in said generating of the authentication value is received, and (iii) the processed packet is reconstructed by using a set of the accumulated encrypted data blocks and the authentication value.

19. The security communication packet processing method according to claim 18, wherein:

said dividing of the inputted packet comprises judging whether the inputted packet is a first type packet requiring the encryption processing and the authentication processing, a second type packet requiring the decryption processing and the authentication processing, a third type packet requiring only one of the encryption processing and the decryption processing, or a fourth type packet requiring the authentication processing only; and when the inputted packet is judged to be the first type packet, said method causes the division in said dividing of the inputted packet, the encryption processing performed in said performing of the encryption processing or the decryption processing, the accumulation in said accumulating of the encrypted data blocks, the authentication processing performed in said performing of the authentication processing and the construction performed in said constructing of the packet to be performed.

20. The security communication packet processing apparatus according to claim 5, wherein said data path connection switching unit is operable to switch a data path between two of said control unit, said at least one encryption processing unit, said at least one authentication processing unit and said at least one data block accumulation unit, so that only packets A pass through said at least one data block accumulation unit and only packets B bypass said at least one data block accumulation unit, the packets A being a packet which requires both encryption processing and authentication processing and a packet which requires both decryption processing and authentication processing, and the packets B being a packet which requires only encryption processing, a packet which requires only decryption processing and a packet which requires only authentication processing.

21. The security communication packet processing apparatus according to claim 9, wherein the at least one data block is saved from said at least one encryption processing unit and said at least one authentication processing unit into said processing data saving unit, and the saved data block is restored from said processing data saving unit to the said at least one encryption processing unit and said at least one authentication processing unit, via said at least one data block accumulation unit.

22. The security communication packet processing apparatus according to claim 14, wherein said control unit is further operable to make another processing unit read the data block from said processing data saving unit and restart the processing, the another processing unit having a function equivalent to a function of the processing unit performing the processing of the data block of the inputted packet with the lowest priority, from which processing unit the data block is saved into said processing data saving unit.

* * * * *

UNITED STATES PATENT AND TRADEMARK OFFICE
CERTIFICATE OF CORRECTION

| | |
|---|---|
| PATENT NO. | : 7,158,637 B2 |
| APPLICATION NO. | : 10/017392 |
| DATED | : January 2, 2007 |
| INVENTOR(S) | : Yuusaku Ohta et al. |

It is certified that error appears in the above-identified patent and that said Letters Patent is hereby corrected as shown below:

ON THE TITLE PAGE
In section (56), References Cited, under Other Publications, line 4, please change "System of a Chip" to --System on a Chip--.

In section (57), Abstract please change "A security communication packet processing apparatus (100) comprises an encryption processing unit (102) that performs encryption processing and decryption processing in a data block unit of B1 bits, an authentication processing unit (104) that performs authentication processing in a data block unit of B2 (=n.times.B1) bits in parallel to the encryption processing or the decryption processing in the encryption processing unit (102) and outputs an authentication value, a data block accumulation unit (103) that accumulates the data blocks from the encryption processing unit (102) and outputs the data blocks to the authentication processing unit (104) when the accumulated amount of the data blocks reaches B2 bits, a packet construction unit (105) that reconstructs a packet with the data blocks from the encryption processing unit (102) and the authentication value from the authentication processing unit (104), and an encryption and authentication processing control unit (101) that divides the inputted packet into the data blocks of B1 bits and outputs the data blocks sequentially to the encryption processing unit." to --A security communication packet processing apparatus includes an encryption processing unit that performs encryption and decryption processing in a data block unit of B1 bits, an authentication processing unit that performs authentication processing in a data block unit of B2(= n x B1) bits in parallel to the encryption or decryption processing in the encryption processing unit and outputs an authentication value, a data block accumulation unit that accumulates the data blocks from the encryption processing unit and outputs them to the authentication processing unit when the accumulated data blocks reaches B2 bits, a packet construction unit that reconstructs a packet with the data blocks from the encryption processing unit and the authentication value from the authentication processing unit and a processing control unit that divides the inputted packet into the data blocks of B1 bits and outputs the data blocks sequentially to the encryption processing unit.--.

UNITED STATES PATENT AND TRADEMARK OFFICE
CERTIFICATE OF CORRECTION

PATENT NO.       : 7,158,637 B2
APPLICATION NO. : 10/017392
DATED            : January 2, 2007
INVENTOR(S)      : Yuusaku Ohta et al.

It is certified that error appears in the above-identified patent and that said Letters Patent is hereby corrected as shown below:

CLAIM 2
In column 27, line 64, please change "blocks bits each" to --blocks each--.

CLAIM 18
In column 31, line 17, please change "processing:" to --processing;--.

CLAIM 19
In column 32, line 26, please change "processing and" to --processing, and--.

Signed and Sealed this

First Day of May, 2007

JON W. DUDAS
*Director of the United States Patent and Trademark Office*